(12) United States Patent
Poupyrev et al.

(10) Patent No.: US 11,816,101 B2
(45) Date of Patent: *Nov. 14, 2023

(54) RADAR RECOGNITION-AIDED SEARCH

(71) Applicant: Google LLC, Mountain View, CA (US)

(72) Inventors: Ivan Poupyrev, Sunnyvale, CA (US); Gaetano Roberto Aiello, Bend, OR (US)

(73) Assignee: Google LLC, Mountain View, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 17/517,978

(22) Filed: Nov. 3, 2021

(65) Prior Publication Data
US 2022/0058188 A1     Feb. 24, 2022

Related U.S. Application Data

(63) Continuation of application No. 14/504,121, filed on Oct. 1, 2014, now Pat. No. 11,169,988.

(60) Provisional application No. 62/040,925, filed on Aug. 22, 2014.

(51) Int. Cl.
| | |
|---|---|
| *G06F 16/242* | (2019.01) |
| *G06F 3/01* | (2006.01) |
| *G06F 16/29* | (2019.01) |
| *G06F 16/248* | (2019.01) |

(Continued)

(52) U.S. Cl.
CPC ......... *G06F 16/242* (2019.01); *G06F 3/017* (2013.01); *G06F 16/248* (2019.01); *G06F 16/24575* (2019.01); *G06F 16/29* (2019.01); *G06F 16/9537* (2019.01)

(58) Field of Classification Search
None
See application file for complete search history.

(56) References Cited

U.S. PATENT DOCUMENTS

| | | | |
|---|---|---|---|
| 3,570,312 A | 3/1971 | Kreith | |
| 3,610,874 A | 10/1971 | Gagliano | |
| 3,752,017 A | 8/1973 | Lloyd et al. | |

(Continued)

FOREIGN PATENT DOCUMENTS

| | | |
|---|---|---|
| CN | 1299501 | 6/2001 |
| CN | 1462382 | 12/2003 |

(Continued)

OTHER PUBLICATIONS

"Foreign Office Action", CN Application No. 201910587123.2, dated Oct. 20, 2022, 17 pages.

(Continued)

*Primary Examiner* — Thu N Nguyen
(74) *Attorney, Agent, or Firm* — Colby Nipper PLLC

(57) ABSTRACT

This document describes techniques and devices for a radar recognition-aided search. Through use of a radar-based recognition system, gestures made by, and physiological information about, persons can be determined. In the case of physiological information, the techniques can use this information to refine a search. For example, if a person requests a search for a coffee shop, the techniques may refine the search to coffee shops in the direction that the person is walking. In the case of a gesture, the techniques may refine or base a search solely on the gesture. Thus, a search for information about a store, car, or tree can be made responsive to a gesture pointing at the store, car, or tree with or without explicit entry of a search query.

50 Claims, 9 Drawing Sheets

(51) Int. Cl.
*G06F 16/2457* (2019.01)
*G06F 16/9537* (2019.01)

(56) References Cited

U.S. PATENT DOCUMENTS

| | | | |
|---|---|---|---|
| 3,953,706 A | 4/1976 | Harris et al. |
| 4,104,012 A | 8/1978 | Ferrante |
| 4,321,930 A | 3/1982 | Jobsis et al. |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,024,533 A | 6/1991 | Egawa et al. |
| 5,121,124 A | 6/1992 | Spivey et al. |
| 5,298,715 A | 3/1994 | Chalco et al. |
| 5,309,916 A | 5/1994 | Hatschek |
| 5,341,979 A | 8/1994 | Gupta |
| 5,410,471 A | 4/1995 | Alyfuku et al. |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,037,893 A | 3/2000 | Lipman |
| 6,080,690 A | 6/2000 | Lebby et al. |
| 6,101,431 A | 8/2000 | Niwa et al. |
| 6,129,673 A | 10/2000 | Fraden |
| 6,179,785 B1 | 1/2001 | Martinosky et al. |
| 6,210,771 B1 | 4/2001 | Post et al. |
| 6,254,544 B1 | 7/2001 | Hayashi |
| 6,303,924 B1 | 10/2001 | Adan et al. |
| 6,313,825 B1 | 11/2001 | Gilbert |
| 6,340,979 B1 | 1/2002 | Beaton et al. |
| 6,380,882 B1 | 4/2002 | Hegnauer |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,524,239 B1 | 2/2003 | Reed et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,805,672 B2 | 10/2004 | Martin et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 6,970,128 B1 | 11/2005 | Dwelly et al. |
| 6,997,882 B1 | 2/2006 | Parker et al. |
| 7,019,682 B1 | 3/2006 | Louberg et al. |
| 7,134,879 B2 | 11/2006 | Sugimoto et al. |
| 7,158,076 B2 | 1/2007 | Fiore et al. |
| 7,164,820 B2 | 1/2007 | Eves et al. |
| 7,194,371 B1 | 3/2007 | McBride et al. |
| 7,205,932 B2 | 4/2007 | Fiore |
| 7,209,775 B2 | 4/2007 | Bae et al. |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,750,841 B2 | 7/2010 | Oswald et al. |
| 7,791,700 B2 | 9/2010 | Bellamy |
| 7,834,276 B2 | 11/2010 | Chou et al. |
| 7,845,023 B2 | 12/2010 | Swatee |
| 7,941,676 B2 | 5/2011 | Glaser |
| 7,952,512 B1 | 5/2011 | Delker et al. |
| 7,999,722 B2 | 8/2011 | Beeri et al. |
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,193,929 B1 | 6/2012 | Siu et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,326,313 B2 | 12/2012 | McHenry et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,374,668 B1 | 2/2013 | Hayter et al. |
| 8,475,367 B1 | 7/2013 | Yuen et al. |
| 8,505,474 B2 | 8/2013 | Kang et al. |
| 8,509,882 B2 | 8/2013 | Albert et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,576,110 B2 | 11/2013 | Valentine |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,854,433 B1 | 10/2014 | Rafii |
| 8,860,602 B2 | 10/2014 | Nohara et al. |
| 8,921,473 B1 | 12/2014 | Hyman |
| 8,926,509 B2 | 1/2015 | Magar et al. |
| 8,948,839 B1 | 2/2015 | Longinotti-Buitoni et al. |
| 9,055,879 B2 | 6/2015 | Selby et al. |
| 9,075,429 B1 | 7/2015 | Karakotsios et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,223,494 B1 | 12/2015 | DeSalvo et al. |
| 9,229,102 B1 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautiainen et al. |
| 9,346,167 B2 | 5/2016 | O'Connor et al. |
| 9,354,709 B1 | 5/2016 | Heller et al. |
| 9,412,273 B2 | 8/2016 | Ricci |
| 9,508,141 B2 | 11/2016 | Khachaturian et al. |
| 9,511,877 B2 | 12/2016 | Masson |
| 9,524,597 B2 | 12/2016 | Ricci |
| 9,569,001 B2 | 2/2017 | Mistry et al. |
| 9,575,560 B2 | 2/2017 | Poupyrev et al. |
| 9,582,933 B1 | 2/2017 | Mosterman et al. |
| 9,588,625 B2 | 3/2017 | Poupyrev |
| 9,594,443 B2 | 3/2017 | Vanblon et al. |

(56) References Cited

U.S. PATENT DOCUMENTS

| | | |
|---|---|---|
| 9,600,080 B2 | 3/2017 | Poupyrev |
| 9,693,592 B2 | 7/2017 | Robinson et al. |
| 9,699,663 B1 | 7/2017 | Jovancevic |
| 9,729,986 B2 | 8/2017 | Crawley et al. |
| 9,746,551 B2 | 8/2017 | Scholten et al. |
| 9,766,742 B2 | 9/2017 | Papakostas |
| 9,778,749 B2 | 10/2017 | Poupyrev |
| 9,807,619 B2 | 10/2017 | Tsai et al. |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,848,780 B1 | 12/2017 | DeBusschere et al. |
| 9,870,056 B1 | 1/2018 | Yao |
| 9,921,660 B2 | 3/2018 | Poupyrev |
| 9,933,908 B2 | 4/2018 | Poupyrev |
| 9,947,080 B2 | 4/2018 | Nguyen et al. |
| 9,958,541 B2 | 5/2018 | Kishigami et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,016,162 B1 | 7/2018 | Rogers et al. |
| 10,027,923 B1 | 7/2018 | Chang |
| 10,034,630 B2 | 7/2018 | Lee et al. |
| 10,063,427 B1 | 8/2018 | Brown |
| 10,064,582 B2 | 9/2018 | Rogers |
| 10,073,590 B2 | 9/2018 | Dascola et al. |
| 10,080,528 B2 | 9/2018 | DeBusschere et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,405 B2 | 2/2019 | Mazzaro et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 10,304,567 B2 | 5/2019 | Kitagawa et al. |
| 10,310,620 B2 | 6/2019 | Lien et al. |
| 10,310,621 B1 | 6/2019 | Lien et al. |
| 10,376,195 B1 | 8/2019 | Reid et al. |
| 10,379,621 B2 | 8/2019 | Schwesig et al. |
| 10,401,490 B2 | 9/2019 | Gillian et al. |
| 10,409,385 B2 | 9/2019 | Poupyrev, IV |
| 10,459,080 B1 | 10/2019 | Schwesig et al. |
| 10,492,302 B2 | 11/2019 | Karagozler et al. |
| 10,496,182 B2 | 12/2019 | Lien et al. |
| 10,503,883 B1 | 12/2019 | Gillian et al. |
| 10,509,478 B2 | 12/2019 | Poupyrev, IV et al. |
| 10,540,001 B1 | 1/2020 | Poupyrev, IV et al. |
| 10,572,027 B2 | 2/2020 | Poupyrev, IV et al. |
| 10,579,150 B2 | 3/2020 | Gu et al. |
| 10,642,367 B2 | 5/2020 | Poupyrev |
| 10,660,379 B2 | 5/2020 | Poupyrev et al. |
| 10,664,059 B2 | 5/2020 | Poupyrev |
| 10,664,061 B2 | 5/2020 | Poupyrev |
| 10,705,185 B1 | 7/2020 | Lien et al. |
| 10,768,712 B2 | 9/2020 | Schwesig et al. |
| 10,817,065 B1 | 10/2020 | Lien et al. |
| 10,817,070 B2 | 10/2020 | Lien et al. |
| 10,823,841 B1 | 11/2020 | Lien et al. |
| 10,908,696 B2 | 2/2021 | Amihood et al. |
| 10,931,934 B2 | 2/2021 | Richards et al. |
| 10,936,081 B2 | 3/2021 | Poupyrev |
| 10,936,085 B2 | 3/2021 | Poupyrev et al. |
| 10,948,996 B2 | 3/2021 | Poupyrev et al. |
| 11,080,556 B1 | 8/2021 | Gillian et al. |
| 11,103,015 B2 | 8/2021 | Poupyrev et al. |
| 11,132,065 B2 | 9/2021 | Gillian et al. |
| 11,140,787 B2 | 10/2021 | Karagozler et al. |
| 11,169,988 B2 | 11/2021 | Poupyrev et al. |
| 11,175,743 B2 | 11/2021 | Lien et al. |
| 11,219,412 B2 | 1/2022 | Rogers et al. |
| 11,221,682 B2 | 1/2022 | Poupyrev |
| 11,256,335 B2 | 2/2022 | Poupyrev et al. |
| 11,385,721 B2 | 7/2022 | Lien et al. |
| 11,393,092 B2 | 7/2022 | Sun et al. |
| 11,481,040 B2 | 10/2022 | Gillian et al. |
| 11,592,909 B2 | 2/2023 | Poupyrev et al. |
| 11,656,336 B2 | 5/2023 | Amihood et al. |
| 11,698,438 B2 | 7/2023 | Lien et al. |
| 11,698,439 B2 | 7/2023 | Lien et al. |
| 11,709,552 B2 | 7/2023 | Lien et al. |
| 2001/0030624 A1 | 10/2001 | Schwoegler |
| 2001/0035836 A1 | 11/2001 | Miceli et al. |
| 2002/0005778 A1 | 1/2002 | Breed et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0036685 A1 | 2/2003 | Goodman |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0008137 A1 | 1/2004 | Hassebrock et al. |
| 2004/0009729 A1 | 1/2004 | Hill et al. |
| 2004/0046736 A1 | 3/2004 | Pryor et al. |
| 2004/0102693 A1 | 5/2004 | DeBusschere et al. |
| 2004/0157662 A1 | 8/2004 | Tsuchiya |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0195330 A1 | 9/2005 | Zacks |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0100517 A1 | 5/2006 | Phillips |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero Koji et al. |
| 2006/0166620 A1 | 7/2006 | Sorensen |
| 2006/0170584 A1 | 8/2006 | Romero et al. |
| 2006/0183980 A1 | 8/2006 | Yang |
| 2006/0209021 A1 | 9/2006 | Yoo et al. |
| 2006/0244654 A1 | 11/2006 | Cheng et al. |
| 2006/0258205 A1 | 11/2006 | Locher, IV et al. |
| 2006/0284757 A1 | 12/2006 | Zemany |
| 2007/0024488 A1 | 2/2007 | Zemany et al. |
| 2007/0024946 A1 | 2/2007 | Panasyuk et al. |
| 2007/0026695 A1 | 2/2007 | Lee et al. |
| 2007/0027369 A1 | 2/2007 | Pagnacco et al. |
| 2007/0030195 A1 | 2/2007 | Steinway et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2007/0276262 A1 | 11/2007 | Banet et al. |
| 2007/0276632 A1 | 11/2007 | Banet et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0074307 A1 | 3/2008 | Boric-Lubecke et al. |

(56) References Cited

U.S. PATENT DOCUMENTS

| | | |
|---|---|---|
| 2008/0122796 A1 | 5/2008 | Jobs et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0168403 A1 | 7/2008 | Westerman et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0002220 A1 | 1/2009 | Lovberg et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0292468 A1 | 11/2009 | Wu et al. |
| 2009/0295712 A1 | 12/2009 | Ritzau |
| 2009/0299197 A1 | 12/2009 | Antonelli et al. |
| 2009/0303100 A1 | 12/2009 | Zemany |
| 2009/0319181 A1 | 12/2009 | Khosravy et al. |
| 2010/0013676 A1 | 1/2010 | Do et al. |
| 2010/0045513 A1 | 2/2010 | Pelt Todd et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0107099 A1 | 4/2010 | Frazier et al. |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Shuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0242305 A1 | 10/2011 | Peterson et al. |
| 2011/0245688 A1 | 10/2011 | Arora et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0013571 A1 | 1/2012 | Yeh et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0069043 A1 | 3/2012 | Narita et al. |
| 2012/0075958 A1 | 3/2012 | Hintz |
| 2012/0092284 A1 | 4/2012 | Rofougaran et al. |
| 2012/0105358 A1 | 5/2012 | Momeyer et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0146950 A1 | 6/2012 | Park et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0191223 A1 | 7/2012 | Dharwada et al. |
| 2012/0193801 A1 | 8/2012 | Gross et al. |
| 2012/0200600 A1 | 8/2012 | Demaine |
| 2012/0220835 A1 | 8/2012 | Chung |
| 2012/0243374 A1 | 9/2012 | Dahl et al. |
| 2012/0248093 A1 | 10/2012 | Ulrich et al. |
| 2012/0254810 A1 | 10/2012 | Heck et al. |
| 2012/0268310 A1 | 10/2012 | Kim |
| 2012/0268416 A1 | 10/2012 | Pirogov et al. |
| 2012/0270564 A1 | 10/2012 | Gum et al. |
| 2012/0276849 A1 | 11/2012 | Hyde et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angelides |
| 2013/0046544 A1 | 2/2013 | Kay et al. |
| 2013/0053653 A1 | 2/2013 | Cuddihy et al. |
| 2013/0076649 A1 | 3/2013 | Myers et al. |
| 2013/0076788 A1 | 3/2013 | Ben Zvi |
| 2013/0078624 A1 | 3/2013 | Holmes et al. |
| 2013/0079649 A1 | 3/2013 | Mestha et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0106710 A1 | 5/2013 | Ashbrook |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0154919 A1 | 6/2013 | An et al. |
| 2013/0161078 A1 | 6/2013 | Li |
| 2013/0169471 A1 | 7/2013 | Lynch |
| 2013/0176161 A1 | 7/2013 | Derham et al. |
| 2013/0176258 A1 | 7/2013 | Dahl et al. |

(56) References Cited

U.S. PATENT DOCUMENTS

| | | |
|---|---|---|
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0222232 A1 | 8/2013 | Kong et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0249793 A1 | 9/2013 | Zhu et al. |
| 2013/0253029 A1 | 9/2013 | Jain et al. |
| 2013/0260630 A1 | 10/2013 | Ito et al. |
| 2013/0263029 A1 | 10/2013 | Rossi et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0310700 A1 | 11/2013 | Wiard et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0035737 A1 | 2/2014 | Rashid et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139430 A1 | 5/2014 | Leung |
| 2014/0139616 A1 | 5/2014 | Pinter et al. |
| 2014/0143678 A1 | 5/2014 | Mistry et al. |
| 2014/0145955 A1 | 5/2014 | Gomez et al. |
| 2014/0149859 A1 | 5/2014 | Van Dyken et al. |
| 2014/0181509 A1 | 6/2014 | Liu |
| 2014/0184496 A1 | 7/2014 | Gribetz et al. |
| 2014/0184499 A1 | 7/2014 | Kim |
| 2014/0188989 A1 | 7/2014 | Stekkelpak et al. |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0203080 A1 | 7/2014 | Hintz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0265642 A1 | 9/2014 | Utley et al. |
| 2014/0270698 A1 | 9/2014 | Luna et al. |
| 2014/0275854 A1 | 9/2014 | Venkatraman et al. |
| 2014/0276104 A1 | 9/2014 | Tao et al. |
| 2014/0280295 A1 | 9/2014 | Kurochkin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0077345 A1 | 3/2015 | Hwang et al. |
| 2015/0084855 A1 | 3/2015 | Song et al. |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177374 A1 | 6/2015 | Driscoll et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0204973 A1 | 7/2015 | Nohara et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0257653 A1 | 9/2015 | Hyde et al. |
| 2015/0261320 A1 | 9/2015 | Leto |
| 2015/0268027 A1 | 9/2015 | Gerdes |
| 2015/0268799 A1 | 9/2015 | Starner et al. |
| 2015/0276925 A1 | 10/2015 | Scholten et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0297105 A1 | 10/2015 | Pahlevan et al. |
| 2015/0301167 A1 | 10/2015 | Sentelle et al. |
| 2015/0312041 A1 | 10/2015 | Choi |
| 2015/0314780 A1 | 11/2015 | Stenneth et al. |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346701 A1 | 12/2015 | Gordon et al. |
| 2015/0346820 A1 | 12/2015 | Poupyrev et al. |
| 2015/0350902 A1 | 12/2015 | Baxley et al. |
| 2015/0351703 A1 | 12/2015 | Phillips et al. |
| 2015/0370250 A1 | 12/2015 | Bachrach et al. |
| 2015/0375339 A1 | 12/2015 | Sterling et al. |
| 2016/0011668 A1 | 1/2016 | Gilad-Bachrach et al. |
| 2016/0018948 A1 | 1/2016 | Parvarandeh et al. |
| 2016/0026253 A1 | 1/2016 | Bradski et al. |
| 2016/0026768 A1 | 1/2016 | Singh et al. |
| 2016/0038083 A1 | 2/2016 | Ding et al. |
| 2016/0041617 A1 | 2/2016 | Poupyrev, IV |
| 2016/0041618 A1 | 2/2016 | Poupyrev, IV |
| 2016/0042169 A1 | 2/2016 | Polehn |
| 2016/0045706 A1 | 2/2016 | Gary et al. |
| 2016/0048235 A1 | 2/2016 | Poupyrev, IV |
| 2016/0048236 A1 | 2/2016 | Poupyrev, IV |

(56) References Cited

U.S. PATENT DOCUMENTS

| | | |
|---|---|---|
| 2016/0048672 A1 | 2/2016 | Lux et al. |
| 2016/0054792 A1 | 2/2016 | Poupyrev, IV |
| 2016/0054803 A1 | 2/2016 | Poupyrev, IV |
| 2016/0054804 A1 | 2/2016 | Gollakata et al. |
| 2016/0055201 A1 | 2/2016 | Poupyrev, IV et al. |
| 2016/0075015 A1 | 3/2016 | Izhikevich et al. |
| 2016/0075016 A1 | 3/2016 | Laurent et al. |
| 2016/0077202 A1 | 3/2016 | Hirvonen et al. |
| 2016/0085296 A1 | 3/2016 | Mo et al. |
| 2016/0089042 A1 | 3/2016 | Saponas et al. |
| 2016/0090839 A1 | 3/2016 | Stolarczyk |
| 2016/0096270 A1 | 4/2016 | Ibarz Gabardos et al. |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0124579 A1 | 5/2016 | Tokutake |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0234365 A1 | 8/2016 | Alameh et al. |
| 2016/0238696 A1 | 8/2016 | Hintz |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0291143 A1 | 10/2016 | Cao et al. |
| 2016/0299526 A1 | 10/2016 | Inagaki et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev, IV et al. |
| 2016/0377712 A1 | 12/2016 | Wu et al. |
| 2017/0011210 A1 | 1/2017 | Cheong et al. |
| 2017/0013417 A1 | 1/2017 | Zampini, II |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0131395 A1 | 5/2017 | Reynolds et al. |
| 2017/0164904 A1 | 6/2017 | Kirenko |
| 2017/0168630 A1 | 6/2017 | Khoshkava et al. |
| 2017/0192523 A1 | 7/2017 | Poupyrev |
| 2017/0192629 A1 | 7/2017 | Takada et al. |
| 2017/0196513 A1 | 7/2017 | Longinotti-Buitoni et al. |
| 2017/0224280 A1 | 8/2017 | Bozkurt et al. |
| 2017/0231089 A1 | 8/2017 | Van Keymeulen |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0258366 A1 | 9/2017 | Tupin et al. |
| 2017/0291301 A1 | 10/2017 | Gabardos et al. |
| 2017/0322633 A1 | 11/2017 | Shen et al. |
| 2017/0325337 A1 | 11/2017 | Karagozler et al. |
| 2017/0325518 A1 | 11/2017 | Poupyrev, IV et al. |
| 2017/0329412 A1 | 11/2017 | Schwesig et al. |
| 2017/0329425 A1 | 11/2017 | Karagozler et al. |
| 2017/0356992 A1 | 12/2017 | Scholten et al. |
| 2018/0000354 A1 | 1/2018 | DeBusschere et al. |
| 2018/0000355 A1 | 1/2018 | DeBusschere et al. |
| 2018/0004301 A1 | 1/2018 | Poupyrev, IV |
| 2018/0005766 A1 | 1/2018 | Fairbanks et al. |
| 2018/0046258 A1 | 2/2018 | Poupyrev, IV |
| 2018/0095541 A1 | 4/2018 | Gribetz et al. |
| 2018/0106897 A1 | 4/2018 | Shouldice et al. |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0177464 A1 | 6/2018 | DeBusschere et al. |
| 2018/0196527 A1 | 7/2018 | Poupyrev, IV et al. |
| 2018/0256106 A1 | 9/2018 | Rogers et al. |
| 2018/0296163 A1 | 10/2018 | DeBusschere et al. |
| 2018/0321841 A1 | 11/2018 | Lapp |
| 2019/0030713 A1 | 1/2019 | Gabardos et al. |
| 2019/0033981 A1 | 1/2019 | Poupyrev |
| 2019/0138109 A1 | 5/2019 | Poupyrev et al. |
| 2019/0155396 A1 | 5/2019 | Lien et al. |
| 2019/0208837 A1 | 7/2019 | Poupyrev et al. |
| 2019/0232156 A1 | 8/2019 | Amihood et al. |
| 2019/0243464 A1 | 8/2019 | Lien et al. |
| 2019/0257939 A1 | 8/2019 | Schwesig et al. |
| 2019/0278379 A1 | 9/2019 | Gribetz et al. |
| 2019/0321719 A1 | 10/2019 | Gillian et al. |
| 2019/0391667 A1 | 12/2019 | Poupyrev |
| 2019/0394884 A1 | 12/2019 | Karagozler et al. |
| 2020/0064471 A1 | 2/2020 | Gatland et al. |
| 2020/0064924 A1 | 2/2020 | Poupyrev et al. |
| 2020/0089314 A1 | 3/2020 | Poupyrev et al. |
| 2020/0150776 A1 | 5/2020 | Poupyrev et al. |
| 2020/0218361 A1 | 7/2020 | Poupyrev |
| 2020/0229515 A1 | 7/2020 | Poupyrev et al. |
| 2020/0264765 A1 | 8/2020 | Poupyrev et al. |
| 2020/0278422 A1 | 9/2020 | Lien et al. |
| 2020/0326708 A1 | 10/2020 | Wang et al. |
| 2020/0393912 A1 | 12/2020 | Lien et al. |
| 2020/0409472 A1 | 12/2020 | Lien et al. |
| 2021/0096653 A1 | 4/2021 | Amihood et al. |
| 2021/0132702 A1 | 5/2021 | Poupyrev |
| 2021/0326642 A1 | 10/2021 | Gillian et al. |
| 2021/0365124 A1 | 11/2021 | Gillian et al. |
| 2022/0019291 A1 | 1/2022 | Lien |
| 2022/0043519 A1 | 2/2022 | Poupyrev et al. |
| 2022/0066567 A1 | 3/2022 | Lien et al. |
| 2022/0066568 A1 | 3/2022 | Lien et al. |
| 2023/0273298 A1 | 8/2023 | Amihood et al. |

FOREIGN PATENT DOCUMENTS

| | | |
|---|---|---|
| CN | 1862601 | 11/2006 |
| CN | 101349943 | 1/2009 |
| CN | 101437442 | 5/2009 |
| CN | 101636711 | 1/2010 |
| CN | 101751126 | 6/2010 |
| CN | 101910781 | 12/2010 |
| CN | 102031615 | 4/2011 |
| CN | 102160471 | 8/2011 |
| CN | 102184020 | 9/2011 |
| CN | 102414641 | 4/2012 |
| CN | 102473032 | 5/2012 |
| CN | 102782612 | 11/2012 |
| CN | 102819315 | 12/2012 |
| CN | 102893327 | 1/2013 |
| CN | 106342197 | 2/2013 |
| CN | 202887794 | 4/2013 |
| CN | 103076911 | 5/2013 |
| CN | 103091667 | 5/2013 |
| CN | 103502911 | 1/2014 |
| CN | 103534664 | 1/2014 |

(56) References Cited

FOREIGN PATENT DOCUMENTS

| | | |
|---|---|---|
| CN | 102660988 | 3/2014 |
| CN | 103675868 | 3/2014 |
| CN | 103907405 | 7/2014 |
| CN | 104035552 | 9/2014 |
| CN | 104094194 | 10/2014 |
| CN | 104115118 | 10/2014 |
| CN | 104838336 | 8/2015 |
| CN | 103355860 | 1/2016 |
| CN | 106154270 | 11/2016 |
| DE | 102011075725 | 11/2012 |
| DE | 102013201259 | 7/2014 |
| DE | 102013201359 | 7/2014 |
| EP | 0161895 | 11/1985 |
| EP | 1785744 | 5/2007 |
| EP | 1815788 | 8/2007 |
| EP | 2177017 | 4/2010 |
| EP | 2417908 | 2/2012 |
| EP | 2637081 | 9/2013 |
| EP | 2770408 | 8/2014 |
| EP | 2014165476 | 10/2014 |
| EP | 2953007 | 12/2015 |
| EP | 2923642 | 3/2017 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | H11168268 | 6/1999 |
| JP | 2003500759 | 1/2003 |
| JP | 2003280049 | 10/2003 |
| JP | 2006163886 | 6/2006 |
| JP | 2006234716 | 9/2006 |
| JP | 2007011873 | 1/2007 |
| JP | 2007132768 | 5/2007 |
| JP | 2007266772 | 10/2007 |
| JP | 2007333385 | 12/2007 |
| JP | 2008287714 | 11/2008 |
| JP | 2008293501 | 12/2008 |
| JP | 2009037434 | 2/2009 |
| JP | 2010048583 | 3/2010 |
| JP | 2010049583 | 3/2010 |
| JP | 2011003202 | 1/2011 |
| JP | 2011086114 | 4/2011 |
| JP | 2011102457 | 5/2011 |
| JP | 2012068854 | 4/2012 |
| JP | 201218583 | 9/2012 |
| JP | 2012185833 | 9/2012 |
| JP | 2012198916 | 10/2012 |
| JP | 2012208714 | 10/2012 |
| JP | 2013016060 | 1/2013 |
| JP | 2013037674 | 2/2013 |
| JP | 2013196047 | 9/2013 |
| JP | 2013251913 | 12/2013 |
| JP | 2014503873 | 2/2014 |
| JP | 2014532332 | 12/2014 |
| JP | 2015507263 | 3/2015 |
| JP | 2015509634 | 3/2015 |
| JP | 2021085256 | 6/2021 |
| KR | 1020080102516 | 11/2008 |
| KR | 100987650 | 10/2010 |
| KR | 20130045222 | 5/2013 |
| KR | 1020130137005 | 12/2013 |
| KR | 20140027837 | 3/2014 |
| KR | 20140053988 | 5/2014 |
| KR | 1020140055985 | 5/2014 |
| KR | 101999712 | 1/2017 |
| KR | 101914850 | 10/2018 |
| TW | 201425974 | 7/2014 |
| WO | 9001895 | 3/1990 |
| WO | 0130123 | 4/2001 |
| WO | 2001027855 | 4/2001 |
| WO | 0175778 | 10/2001 |
| WO | 2002082999 | 10/2002 |
| WO | 2004004557 | 1/2004 |
| WO | 2004053601 | 6/2004 |
| WO | 2005033387 | 4/2005 |
| WO | 2005103863 | 11/2005 |
| WO | 2007125298 | 11/2007 |
| WO | 2008061385 | 5/2008 |
| WO | 2009032073 | 3/2009 |
| WO | 2009083467 | 7/2009 |
| WO | 2009148064 | 12/2009 |
| WO | 2010032173 | 3/2010 |
| WO | 2010101697 | 9/2010 |
| WO | 2012026013 | 3/2012 |
| WO | 2012064847 | 5/2012 |
| WO | 2012152476 | 11/2012 |
| WO | 2013082806 | 6/2013 |
| WO | 2013084108 | 6/2013 |
| WO | 2013137412 | 9/2013 |
| WO | 2013154864 | 10/2013 |
| WO | 2013186696 | 12/2013 |
| WO | 2013191657 | 12/2013 |
| WO | 2013192166 | 12/2013 |
| WO | 2014019085 | 2/2014 |
| WO | 2014032984 | 3/2014 |
| WO | 2014085369 | 6/2014 |
| WO | 2014116968 | 7/2014 |
| WO | 2014124520 | 8/2014 |
| WO | 2014136027 | 9/2014 |
| WO | 2014138280 | 9/2014 |
| WO | 2014160893 | 10/2014 |
| WO | 2014165476 | 10/2014 |
| WO | 2014204323 | 12/2014 |
| WO | 2015017931 | 2/2015 |
| WO | 2015018675 | 2/2015 |
| WO | 2015022671 | 2/2015 |
| WO | 2015099796 | 7/2015 |
| WO | 2015149049 | 10/2015 |
| WO | 2016053624 | 4/2016 |
| WO | 2016118534 | 7/2016 |
| WO | 2016154560 | 9/2016 |
| WO | 2016154568 | 9/2016 |
| WO | 2016176471 | 11/2016 |
| WO | 2016176600 | 11/2016 |
| WO | 2016176606 | 11/2016 |
| WO | 2016178797 | 11/2016 |
| WO | 2017019299 | 2/2017 |
| WO | 2017062566 | 4/2017 |
| WO | 2017079484 | 5/2017 |
| WO | 2017200570 | 11/2017 |
| WO | 2017200571 | 11/2017 |
| WO | 20170200949 | 11/2017 |
| WO | 2018106306 | 6/2018 |

OTHER PUBLICATIONS

"Foreign Office Action", EP Application No. 20174555.1, dated Dec. 7, 2022, 9 pages.
"Non-Final Office Action", U.S. Appl. No. 17/023,122, dated Sep. 16, 2022, 10 pages.
"Non-Final Office Action", U.S. Appl. No. 17/500,747, dated Nov. 10, 2022, 32 pages.
"Non-Final Office Action", U.S. Appl. No. 17/523,051, dated Nov. 10, 2022, 33 pages.
"Non-Final Office Action", U.S. Appl. No. 17/488,015, dated Nov. 10, 2022, 47 pages.
"Notice of Allowance", U.S. Appl. No. 17/506,605, dated Oct. 19, 2022, 5 pages.
"Non-Final Office Action", U.S. Appl. No. 17/023,122, dated Jan. 24, 2022, 25 pages.
"Notice of Allowance", U.S. Appl. No. 17/119,312, dated Jan. 13, 2023, 5 pages.
"Notice of Allowance", U.S. Appl. No. 17/523,051, dated Feb. 28, 2023, 5 pages.
"Notice of Allowance", U.S. Appl. No. 17/488,015, dated Mar. 1, 2023, 5 pages.
"Notice of Allowance", U.S. Appl. No. 17/500,747, dated Mar. 1, 2023, 5 pages.
"Notice of Allowance", U.S. Appl. No. 17/023,122, dated Mar. 6, 2023, 9 pages.

(56) References Cited

OTHER PUBLICATIONS

"Non-Final Office Action", U.S. Appl. No. 17/506,605, dated Jul. 27, 2022, 7 pages.
"Non-Final Office Action", U.S. Appl. No. 17/119,312, dated Sep. 2, 2022, 6 pages.
"Notice of Allowance", U.S. Appl. No. 17/361,824, dated Jun. 9, 2022, 9 pages.
"Final Office Action", U.S. Appl. No. 17/023,122, dated Apr. 7, 2022, 12 pages.
"Notice of Allowance", U.S. Appl. No. 16/875,427, dated Feb. 22, 2022, 13 pages.
"Advisory Action", U.S. Appl. No. 16/689,519, dated Jun. 30, 2021, 2 pages.
"Advisory Action", U.S. Appl. No. 14/504,139, dated Aug. 28, 2017, 3 pages.
"Advisory Action", U.S. Appl. No. 15/704,825, dated Feb. 10, 2021, 4 pages.
"Apple Watch Used Four Sensors to Detect your Pulse", retrieved from http://www.theverge.com/2014/9/9/6126991/apple-watch-four-back-sensors-detect-activity on Sep. 23, 2017 as cited in PCT search report for PCT Application No. PCT/US2016/026756 dated Nov. 10, 2017; The Verge, paragraph 1, Sep. 9, 2014, 4 pages.
"Cardiio", Retrieved From: <http://www.cardiio.com/> Apr. 15, 2015 App Information Retrieved From: <https://itunes.apple.com/us/app/cardiio-touchless-camera-pulse/id542891434?ls=1&mt=8>Apr. 15, 2015, Feb. 24, 2015, 6 pages.
"Clever Toilet Checks on Your Health", CNN.Com; Technology, Jun. 28, 2005, 2 pages.
"Combined Search and Examination Report", GB Application No. 1620892.8, dated Apr. 6, 2017, 5 pages.
"Combined Search and Examination Report", GB Application No. 1620891.0, dated May 31, 2017, 9 pages.
"EP Appeal Decision", EP Application No. 10194359.5, May 28, 2019, 20 pages.
"European Search Report", European Application No. 16789735.4, dated Nov. 14, 2018, 4 pages.
"Extended European Search Report", European Application No. 19164113.3, dated Jun. 13, 2019, 11 pages.
"Extended European Search Report", EP Application No. 15170577.9, dated Nov. 5, 2015, 12 pages.
"Extended European Search Report", European Application No. 19158625.4, dated May 8, 2019, 16 pages.
"Extended European Search Report", EP Application No. 20174555.1, dated Oct. 13, 2020, 9 pages.
"Final Office Action", U.S. Appl. No. 15/462,957, dated Nov. 8, 2019, 10 Pages.
"Final Office Action", U.S. Appl. No. 14/504,061, dated Mar. 9, 2016, 10 pages.
"Final Office Action", U.S. Appl. No. 14/681,625, dated Dec. 7, 2016, 10 pages.
"Final Office Action", U.S. Appl. No. 15/287,253, dated Apr. 2, 2019, 10 pages.
"Final Office Action", U.S. Appl. No. 15/398,147, dated Jun. 30, 2017, 11 pages.
"Final Office Action", U.S. Appl. No. 15/287,155, dated Apr. 10, 2019, 11 pages.
"Final Office Action", U.S. Appl. No. 14/959,799, dated Jul. 19, 2017, 12 pages.
"Final Office Action", U.S. Appl. No. 14/731,195, dated Oct. 11, 2018, 12 pages.
"Final Office Action", U.S. Appl. No. 16/689,519, dated Apr. 29, 2021, 13 pages.
"Final Office Action", U.S. Appl. No. 15/595,649, dated May 23, 2018, 13 pages.
"Final Office Action", U.S. Appl. No. 14/715,454, dated Sep. 7, 2017, 14 pages.
"Final Office Action", U.S. Appl. No. 16/503,234, dated Dec. 30, 2020, 14 pages.
"Final Office Action", U.S. Appl. No. 14/504,139, dated May 1, 2018, 14 pages.
"Final Office Action", U.S. Appl. No. 15/286,512, dated Dec. 26, 2018, 15 pages.
"Final Office Action", U.S. Appl. No. 15/142,619, dated Feb. 8, 2018, 15 pages.
"Final Office Action", U.S. Appl. No. 16/238,464, dated Jul. 25, 2019, 15 pages.
"Final Office Action", U.S. Appl. No. 15/287,359, dated Feb. 19, 2020, 16 Pages.
"Final Office Action", U.S. Appl. No. 14/504,121, dated Aug. 8, 2017, 16 pages.
"Final Office Action", U.S. Appl. No. 14/959,730, dated Nov. 22, 2017, 16 pages.
"Final Office Action", U.S. Appl. No. 15/142,689, dated Jun. 1, 2018, 16 pages.
"Final Office Action", U.S. Appl. No. 14/959,799, dated Jan. 4, 2018, 17 pages.
"Final Office Action", U.S. Appl. No. 14/720,632, dated Jan. 9, 2018, 18 pages.
"Final Office Action", U.S. Appl. No. 15/704,825, dated Nov. 23, 2020, 18 pages.
"Final Office Action", U.S. Appl. No. 14/518,863, dated May 5, 2017, 18 pages.
"Final Office Action", U.S. Appl. No. 14/959,901, dated May 30, 2019, 18 pages.
"Final Office Action", U.S. Appl. No. 14/959,901, dated Aug. 25, 2017, 19 pages.
"Final Office Action", U.S. Appl. No. 15/093,533, dated Mar. 21, 2018, 19 pages.
"Final Office Action", U.S. Appl. No. 14/715,454, dated Apr. 17, 2018, 19 pages.
"Final Office Action", U.S. Appl. No. 15/286,537, dated Apr. 19, 2019, 21 pages.
"Final Office Action", U.S. Appl. No. 14/518,863, dated Apr. 5, 2018, 21 pages.
"Final Office Action", U.S. Appl. No. 15/596,702, dated Jun. 13, 2019, 21 pages.
"Final Office Action", U.S. Appl. No. 14/959,901, dated Jun. 15, 2018, 21 pages.
"Final Office Action", U.S. Appl. No. 15/287,308, dated Feb. 8, 2019, 23 pages.
"Final Office Action", U.S. Appl. No. 14/599,954, dated Aug. 10, 2016, 23 pages.
"Final Office Action", U.S. Appl. No. 14/504,038, dated Sep. 27, 2016, 23 pages.
"Final Office Action", U.S. Appl. No. 14/504,121, dated Jul. 9, 2018, 23 pages.
"Final Office Action", U.S. Appl. No. 15/286,152, dated Jun. 26, 2018, 25 pages.
"Final Office Action", U.S. Appl. No. 15/704,615, dated Dec. 11, 2020, 26 pages.
"Final Office Action", U.S. Appl. No. 15/142,471, dated Jun. 20, 2019, 26 pages.
"Final Office Action", U.S. Appl. No. 15/596,702, dated Apr. 14, 2020, 27 Pages.
"Final Office Action", U.S. Appl. No. 15/403,066, dated Oct. 5, 2017, 31 pages.
"Final Office Action", U.S. Appl. No. 15/267,181, dated Jun. 7, 2018, 31 pages.
"Final Office Action", U.S. Appl. No. 14/312,486, dated Jun. 3, 2016, 32 pages.
"Final Office Action", U.S. Appl. No. 15/166,198, dated Sep. 27, 2018, 33 pages.
"Final Office Action", U.S. Appl. No. 15/287,394, dated Sep. 30, 2019, 38 Pages.
"Final Office Action", U.S. Appl. No. 14/699,181, dated May 4, 2018, 41 pages.
"Final Office Action", U.S. Appl. No. 14/715,793, dated Sep. 12, 2017, 7 pages.
"Final Office Action", U.S. Appl. No. 14/809,901, dated Dec. 13, 2018, 7 pages.
"Final Office Action", Korean Application No. 10-2016-7036023, dated Feb. 19, 2018, 8 pages.

(56) References Cited

OTHER PUBLICATIONS

"Final Office Action", U.S. Appl. No. 14/874,955, dated Jun. 30, 2017, 9 pages.
"Final Office Action", U.S. Appl. No. 14/874,955, dated Jun. 11, 2018, 9 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 16/080,293, dated Jul. 23, 2020, 3 Pages.
"First Action Interview Office Action", U.S. Appl. No. 14/959,901, dated Apr. 14, 2017, 3 pages.
"First Action Interview Office Action", U.S. Appl. No. 14/731,195, dated Jun. 21, 2018, 4 pages.
"First Action Interview Office Action", U.S. Appl. No. 15/286,152, dated Mar. 1, 2018, 5 pages.
"First Action Interview Office Action", U.S. Appl. No. 15/917,238, dated Jun. 6, 2019, 6 pages.
"First Action Interview Office Action", U.S. Appl. No. 15/166,198, dated Apr. 25, 2018, 8 pages.
"First Action Interview Pilot Program Pre-Interview Communication", U.S. Appl. No. 14/731,195, dated Aug. 1, 2017, 3 pages.
"First Exam Report", EP Application No. 15754352.1, dated Mar. 5, 2018, 7 pages.
"First Examination Report", GB Application No. 1621332.4, dated May 16, 2017, 7 pages.
"Foreign Office Action", Chinese Application No. 201580034536.8, dated Oct. 9, 2018.
"Foreign Office Action", CN Application No. 201680006327.7, dated Nov. 13, 2020.
"Foreign Office Action", Korean Application No. 1020187029464, dated Oct. 30, 2018, 1 page.
"Foreign Office Action", KR Application No. 10-2016-7036023, dated Aug. 11, 2017, 10 pages.
"Foreign Office Action", CN Application No. 201680020123.9, dated Nov. 29, 2019, 10 pages.
"Foreign Office Action", Chinese Application No. 201580034908.7, dated Feb. 19, 2019, 10 pages.
"Foreign Office Action", Chinese Application No. 201611159602.7, dated Jul. 23, 2020, 10 pages.
"Foreign Office Action", Chinese Application No. 201611191179.9, dated Aug. 28, 2019, 10 pages.
"Foreign Office Action", KR Application No. 10-2021-7007454, dated Apr. 29, 2021, 11 pages.
"Foreign Office Action", CN Application No. 201710922856.8, dated Jun. 19, 2020, 11 pages.
"Foreign Office Action", Japanese Application No. 2018-501256, dated Jul. 24, 2018, 11 pages.
"Foreign Office Action", JP Application No. 2019-078554, dated Jul. 21, 2020, 12 pages.
"Foreign Office Action", KR Application No. 10-2016-7036396, dated Jan. 3, 2018, 12 pages.
"Foreign Office Action", Chinese Application No. 201580036075.8, dated Jul. 4, 2018, 14 page.
"Foreign Office Action", European Application No. 16725269.1, dated Nov. 26, 2018, 14 pages.
"Foreign Office Action", Chinese Application No. 201680021212.5, dated Sep. 3, 2019, 14 pages.
"Foreign Office Action", JP Application No. 2016-563979, dated Sep. 21, 2017, 15 pages.
"Foreign Office Action", Japanese Application No. 1020187027694, dated Nov. 23, 2018, 15 pages.
"Foreign Office Action", CN Application No. 201611159870.9, dated Dec. 17, 2019, 15 pages.
"Foreign Office Action", European Application No. 16725269.1, dated Mar. 24, 2020, 15 pages.
"Foreign Office Action", JP Application No. 2020027181, dated Nov. 17, 2020, 16 pages.
"Foreign Office Action", CN Application No. 201580034908.7, dated Jul. 3, 2018, 17 pages.
"Foreign Office Action", Chinese Application No. 201510300495.4, dated Jun. 21, 2018, 18 pages.
"Foreign Office Action", Chinese Application No. 201680020567.2, dated Sep. 26, 2019, 19 pages.
"Foreign Office Action", KR Application No. 10-2019-7004803, dated Oct. 14, 2019, 2 pages.
"Foreign Office Action", KR Application No. 10-2019-7004803, dated Dec. 6, 2019, 2 pages.
"Foreign Office Action", Chinese Application No. 201611159602.7, dated Oct. 11, 2019, 20 pages.
"Foreign Office Action", Chinese Application No. 201580035246.5, dated Jan. 31, 2019, 22 pages.
"Foreign Office Action", Chinese Application No. 201680021213.X, dated Oct. 28, 2019, 26 pages.
"Foreign Office Action", European Application No. 16725269.1, dated Feb. 9, 2021, 26 pages.
"Foreign Office Action", CN Application No. 201680038897.4, dated Jun. 29, 2020, 28 pages.
"Foreign Office Action", Japanese Application No. 2018156138, dated May 22, 2019, 3 pages.
"Foreign Office Action", GB Application No. 1621191.4, dated Sep. 10, 2021, 3 pages.
"Foreign Office Action", JP Application No. 2018156138, dated Sep. 30, 2019, 3 pages.
"Foreign Office Action", Korean Application No. 102016-7036015, dated Oct. 15, 2018, 3 pages.
"Foreign Office Action", GB Application No. 1621332.4, dated Nov. 6, 2019, 3 pages.
"Foreign Office Action", Japanese Application No. 2018501256, dated Feb. 26, 2019, 3 pages.
"Foreign Office Action", Japanese Application No. 2018156138, dated Apr. 22, 2020, 3 pages.
"Foreign Office Action", Japanese Application No. 2016-567839, dated Apr. 3, 2018, 3 pages.
"Foreign Office Action", Japanese Application No. 2018-021296, dated Apr. 9, 2019, 3 pages.
"Foreign Office Action", European Application No. 16784352.3, dated May 16, 2018, 3 pages.
"Foreign Office Action", Japanese Application No. 2016-563979, dated May 21, 2018, 3 pages.
"Foreign Office Action", Chinese Application No. 201721290290.3, dated Jun. 6, 2018, 3 pages.
"Foreign Office Action", CN Application No. 201680038897.4, dated Feb. 1, 2021, 30 pages.
"Foreign Office Action", European Application No. 15170577.9, dated Dec. 21, 2018, 31 pages.
"Foreign Office Action", GB Application No. 1621191.4, dated Jun. 23, 2021, 4 pages.
"Foreign Office Action", Japanese Application No. 2016-575564, dated Jan. 10, 2019, 4 pages.
"Foreign Office Action", GB Application No. 1621191.4, dated Dec. 31, 2020, 4 pages.
"Foreign Office Action", CN Application No. 201721290290.3, dated Mar. 9, 2018, 4 pages.
"Foreign Office Action", Korean Application No. 10-2016-7036023, dated Apr. 12, 2018, 4 pages.
"Foreign Office Action", Japanese Application No. 2016-575564, dated Jul. 10, 2018, 4 pages.
"Foreign Office Action", KR Application No. 10-2021-7009474, dated May 10, 2021, 5 pages.
"Foreign Office Action", KR Application No. 1020217011901, dated Jun. 4, 2021, 5 pages.
"Foreign Office Action", GB Application No. 1621192.2, dated Jun. 17, 2020, 5 pages.
"Foreign Office Action", KR Application No. 10-2016-7035397, dated Sep. 20, 2017, 5 pages.
"Foreign Office Action", Japanese Application No. 2018169008, dated Jan. 14, 2020, 5 pages.
"Foreign Office Action", JP Application No. 2018501256, dated Oct. 23, 2019, 5 pages.

(56) References Cited

OTHER PUBLICATIONS

"Foreign Office Action", Korean Application No. 10-2017-7027877, dated Nov. 23, 2018, 5 pages.
"Foreign Office Action", Japanese Application No. 2017-541972, dated Nov. 27, 2018, 5 pages.
"Foreign Office Action", European Application No. 15754352.1, dated Nov. 7, 2018, 5 pages.
"Foreign Office Action", EP Application No. 16784352.3, dated Dec. 9, 2020, 5 pages.
"Foreign Office Action", European Application No. 16789735.4, dated Dec. 12, 2018, 5 pages.
"Foreign Office Action", Japanese Application No. 2016-575564, dated Dec. 5, 2017, 5 pages.
"Foreign Office Action", UK Application No. 1620891.0, dated Dec. 6, 2018, 5 pages.
"Foreign Office Action", Chinese Application No. 201580036075.8, dated Feb. 19, 2019, 5 pages.
"Foreign Office Action", Japanese Application No. 2016-563979, dated Feb. 7, 2018, 5 pages.
"Foreign Office Action", KR Application No. 1020187004283, dated Sep. 11, 2020, 5 pages.
"Foreign Office Action", British Application No. 1912334.8, dated Sep. 23, 2019, 5 pages.
"Foreign Office Action", KR Application No. 10-2019-7004803, dated Jan. 21, 2021, 6 pages.
"Foreign Office Action", EP Application No. 16724775.8, dated May 27, 2021, 6 pages.
"Foreign Office Action", Korean Application No. 1020197019768, dated Sep. 30, 2019, 6 pages.
"Foreign Office Action", JP Application No. 2016-567813, dated Jan. 16, 2018, 6 pages.
"Foreign Office Action", Korean Application No. 10-2017-7027871, dated Nov. 23, 2018, 6 pages.
"Foreign Office Action", Chinese Application No. 201510300495.4, dated Apr. 10, 2019, 6 pages.
"Foreign Office Action", KR Application No. 10-2019-7004803, dated Apr. 26, 2019, 6 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 1020197023675, dated Jul. 13, 2020, 7 pages.
"Foreign Office Action", KR Application No. 2019-7020454, dated Aug. 26, 2020, 7 pages.
"Foreign Office Action", European Application No. 16716351.8, dated Mar. 15, 2019, 7 pages.
"Foreign Office Action", Chinese Application No. 201680021213.X, dated Aug. 27, 2020, 7 pages.
"Foreign Office Action", IN Application No. 201747044162, dated Sep. 3, 2020, 7 pages.
"Foreign Office Action", JP Application No. 2016-567813, dated Sep. 22, 2017, 8 pages.
"Foreign Office Action", Korean Application No. 1020187004283, dated Jan. 3, 2020, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"Foreign Office Action", European Application No. 16724775.8, dated Nov. 23, 2018, 9 pages.
"Foreign Office Action", DE Application No. 102016014611.7, dated Sep. 28, 2020, 9 pages.
"Foreign Office Action", KR Application No. 10-2016-7032967, English Translation, dated Sep. 14, 2017, 4 pages.
"Foreign Office Acton", EP Application No. 21156948.8, dated May 21, 2021, 15 pages.
"Frogpad Introduces Wearable Fabric Keyboard with Bluetooth Technology", Retrieved From: http://www.geekzone.co.nz/content.asp?contentid=3898> Mar. 16, 2015, Jan. 7, 2005, 2 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Preliminary Report on Patentability", PCT Application No. PCT/US2017/051663, dated Jun. 20, 2019, 10 pages.
"International Preliminary Report on Patentability", PCT Application No. PCT/US2016/063874, dated Nov. 29, 2018, 12 pages.
"International Preliminary Report on Patentability", Application No. PCT/US2015/030388, dated Dec. 15, 2016, 12 pages.
"International Preliminary Report on Patentability", Application No. PCT/US2015/043963, dated Feb. 16, 2017, 12 pages.
"International Preliminary Report on Patentability", Application No. PCT/US2015/050903, dated Apr. 13, 2017, 12 pages.
"International Preliminary Report on Patentability", Application No. PCT/US2015/043949, dated Feb. 16, 2017, 13 pages.
"International Preliminary Report on Patentability", PCT Application No. PCT/US2017/032733, dated Nov. 29, 2018, 7 pages.
"International Preliminary Report on Patentability", PCT Application No. PCT/US2016/026756, dated Oct. 19, 2017, 8 pages.
"International Preliminary Report on Patentability", Application No. PCT/US2015/044774, dated Mar. 2, 2017, 8 pages.
"International Search Report and Written Opinion", Application No. PCT/US2016/060399, dated Jan. 30, 2017, 11 pages.
"International Search Report and Written Opinion", Application No. PCT/US2016/065295, dated Mar. 14, 2017, 12 pages.
"International Search Report and Written Opinion", Application No. PCT/US2015/044774, dated Nov. 3, 2015, 12 pages.
"International Search Report and Written Opinion", Application No. PCT/US2016/042013, dated Oct. 26, 2016, 12 pages.
"International Search Report and Written Opinion", Application No. PCT/US2016/062082, dated Feb. 23, 2017, 12 pages.
"International Search Report and Written Opinion", PCT/US2017/047691, dated Nov. 16, 2017, 13 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/034366, dated Nov. 17, 2016, 13 pages.
"International Search Report and Written Opinion", Application No. PCT/US2016/029820, dated Jul. 15, 2016, 14 pages.
"International Search Report and Written Opinion", Application No. PCT/US2016/055671, dated Dec. 1, 2016, 14 pages.
"International Search Report and Written Opinion", Application No. PCT/US2016/030177, dated Aug. 2, 2016, 15 pages.
"International Search Report and Written Opinion", PCT Application No. PCT/US2017/051663, dated Nov. 29, 2017, 16 pages.
"International Search Report and Written Opinion", Application No. PCT/US2015/043963, dated Nov. 24, 2015, 16 pages.
"International Search Report and Written Opinion", Application No. PCT/US2016/024289, dated Aug. 25, 2016, 17 pages.
"International Search Report and Written Opinion", Application No. PCT/US2015/043949, dated Dec. 1, 2015, 18 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2016/063874, dated May 11, 2017, 19 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 15/596,702, dated Jan. 4, 2019, 10 pages.
"Non-Final Office Action", U.S. Appl. No. 16/153,395, dated Oct. 22, 2019, 10 Pages.
"Non-Final Office Action", U.S. Appl. No. 15/286,837, dated Oct. 26, 2018, 10 pages.

(56) References Cited

OTHER PUBLICATIONS

"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Non-Final Office Action", U.S. Appl. No. 15/398,147, dated Mar. 9, 2017, 10 pages.
"Non-Final Office Action", U.S. Appl. No. 16/843,813, dated Mar. 18, 2021, 12 pages.
"Non-Final Office Action", U.S. Appl. No. 14/504,139, dated Oct. 18, 2017, 12 pages.
"Non-Final Office Action", U.S. Appl. No. 15/287,155, dated Dec. 10, 2018, 12 pages.
"Non-Final Office Action", U.S. Appl. No. 14/666,155, dated Feb. 3, 2017, 12 pages.
"Non-Final Office Action", U.S. Appl. No. 15/424,263, dated May 23, 2019, 12 pages.
"Non-Final Office Action", U.S. Appl. No. 16/669,842, dated Sep. 3, 2020, 12 pages.
"Non-Final Office Action", U.S. Appl. No. 16/252,477, dated Jan. 10, 2020, 13 Pages.
"Non-Final Office Action", U.S. Appl. No. 14/504,121, dated Jan. 9, 2017, 13 pages.
"Non-Final Office Action", U.S. Appl. No. 14/809,901, dated May 24, 2018, 13 pages.
"Non-Final Office Action", U.S. Appl. No. 14/959,730, dated Jun. 23, 2017, 14 pages.
"Non-Final Office Action", U.S. Appl. No. 15/462,957, dated May 24, 2019, 14 pages.
"Non-Final Office Action", U.S. Appl. No. 14/862,409, dated Jun. 22, 2017, 15 pages.
"Non-Final Office Action", U.S. Appl. No. 14/930,220, dated Sep. 14, 2016, 15 pages.
"Non-Final Office Action", U.S. Appl. No. 16/238,464, dated May 7, 2019, 15 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Non-Final Office Action", U.S. Appl. No. 14/720,632, dated Jun. 14, 2017, 16 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 14/715,454, dated Jan. 11, 2018, 16 pages.
"Non-Final Office Action", U.S. Appl. No. 15/595,649, dated Oct. 31, 2017, 16 pages.
"Non-Final Office Action", U.S. Appl. No. 14/504,139, dated Oct. 5, 2018, 16 pages.
"Non-Final Office Action", U.S. Appl. No. 15/976,518, dated Nov. 25, 2020, 16 pages.
"Non-Final Office Action", U.S. Appl. No. 14/518,863, dated Oct. 14, 2016, 16 pages.
"Non-Final Office Action", U.S. Appl. No. 14/599,954, dated Jan. 26, 2017, 16 pages.
"Non-Final Office Action", U.S. Appl. No. 16/822,601, dated Mar. 15, 2021, 17 pages.
"Non-Final Office Action", U.S. Appl. No. 16/503,234, dated Mar. 18, 2021, 17 pages.
"Non-Final Office Action", U.S. Appl. No. 14/862,409, dated Dec. 14, 2017, 17 pages.
"Non-Final Office Action", U.S. Appl. No. 14/599,954, dated Feb. 2, 2016, 17 pages.
"Non-Final Office Action", U.S. Appl. No. 15/287,253, dated Apr. 5, 2018, 17 pages.
"Non-Final Office Action", U.S. Appl. No. 16/503,234, dated Aug. 5, 2020, 18 Pages.
"Non-Final Office Action", U.S. Appl. No. 15/093,533, dated Aug. 24, 2017, 18 pages.
"Non-Final Office Action", U.S. Appl. No. 15/142,689, dated Oct. 4, 2017, 18 pages.
"Non-Final Office Action", U.S. Appl. No. 15/287,308, dated Oct. 15, 2018, 18 pages.
"Non-Final Office Action", U.S. Appl. No. 15/286,537, dated Nov. 19, 2018, 18 pages.
"Non-Final Office Action", U.S. Appl. No. 15/287,359, dated Jun. 26, 2020, 19 Pages.
"Non-Final Office Action", U.S. Appl. No. 14/504,121, dated Jan. 2, 2018, 19 pages.
"Non-Final Office Action", U.S. Appl. No. 15/287,359, dated Oct. 28, 2020, 19 pages.
"Non-Final Office Action", U.S. Appl. No. 15/287,253, dated Sep. 7, 2018, 20 pages.
"Non-Final Office Action", U.S. Appl. No. 14/518,863, dated Sep. 29, 2017, 20 pages.
"Non-Final Office Action", U.S. Appl. No. 14/720,632, dated May 18, 2018, 20 pages.
"Non-Final Office Action", U.S. Appl. No. 14/959,901, dated Jan. 8, 2018, 21 pages.
"Non-Final Office Action", U.S. Appl. No. 15/596,702, dated Oct. 21, 2019, 21 Pages.
"Non-Final Office Action", U.S. Appl. No. 15/704,825, dated Jun. 1, 2020, 22 Pages.
"Non-Final Office Action", U.S. Appl. No. 15/791,044, dated Sep. 30, 2019, 22 Pages.
"Non-Final Office Action", U.S. Appl. No. 14/959,901, dated Oct. 11, 2018, 22 pages.
"Non-Final Office Action", U.S. Appl. No. 16/689,519, dated Oct. 20, 2020, 22 pages.
"Non-Final Office Action", U.S. Appl. No. 14/504,038, dated Feb. 26, 2016, 22 pages.
"Non-Final Office Action", U.S. Appl. No. 17/005,207, dated Apr. 1, 2021, 23 pages.
"Non-Final Office Action", U.S. Appl. No. 14/312,486, dated Oct. 23, 2015, 25 pages.
"Non-Final Office Action", U.S. Appl. No. 15/596,702, dated Aug. 19, 2020, 27 Pages.
"Non-Final Office Action", U.S. Appl. No. 15/286,152, dated Oct. 19, 2018, 27 pages.
"Non-Final Office Action", U.S. Appl. No. 15/286,537, dated Sep. 3, 2019, 28 Pages.
"Non-Final Office Action", U.S. Appl. No. 15/704,615, dated Jun. 1, 2020, 29 Pages.
"Non-Final Office Action", U.S. Appl. No. 15/267,181, dated Feb. 8, 2018, 29 pages.
"Non-Final Office Action", U.S. Appl. No. 15/403,066, dated May 4, 2017, 31 pages.
"Non-Final Office Action", U.S. Appl. No. 14/699,181, dated Oct. 18, 2017, 33 pages.
"Non-Final Office Action", U.S. Appl. No. 14/504,038, dated Mar. 22, 2017, 33 pages.
"Non-Final Office Action", U.S. Appl. No. 16/875,427, dated Oct. 5, 2021, 37 pages.
"Non-Final Office Action", U.S. Appl. No. 15/287,394, dated Mar. 22, 2019, 39 pages.
"Non-Final Office Action", U.S. Appl. No. 15/166,198, dated Feb. 21, 2019, 48 pages.
"Non-Final Office Action", U.S. Appl. No. 15/398,147, dated Sep. 8, 2017, 7 pages.
"Non-Final Office Action", U.S. Appl. No. 14/874,955, dated Feb. 8, 2018, 7 pages.
"Non-Final Office Action", U.S. Appl. No. 14/681,625, dated Mar. 6, 2017, 7 pages.
"Non-Final Office Action", U.S. Appl. No. 15/586,174, dated Jun. 18, 2018, 7 pages.
"Non-Final Office Action", U.S. Appl. No. 14/504,061, dated Nov. 4, 2015, 8 pages.
"Non-Final Office Action", U.S. Appl. No. 14/874,955, dated Feb. 27, 2017, 8 pages.

(56) References Cited

OTHER PUBLICATIONS

"Non-Final Office Action", U.S. Appl. No. 14/513,875, dated Feb. 21, 2017, 9 pages.
"Non-Final Office Action", U.S. Appl. No. 16/744,626, dated Sep. 23, 2020, 9 Pages.
"Non-Final Office Action", U.S. Appl. No. 14/582,896, dated Jun. 29, 2016, 9 pages.
"Non-Final Office Action", U.S. Appl. No. 14/681,625, dated Aug. 12, 2016, 9 pages.
"Non-Final Office Action", U.S. Appl. No. 14/666,155, dated Aug. 24, 2016, 9 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; May 29, 2009, 2 pages.
"Notice of Allowability", U.S. Appl. No. 16/560,085, dated Nov. 12, 2020, 2 pages.
"Notice of Allowance", U.S. Appl. No. 16/744,626, dated Jan. 1, 2021, 10 pages.
"Notice of Allowance", U.S. Appl. No. 16/238,464, dated Nov. 4, 2019, 10 Pages.
"Notice of Allowance", U.S. Appl. No. 15/424,263, dated Nov. 14, 2019, 10 Pages.
"Notice of Allowance", U.S. Appl. No. 15/287,394, dated Mar. 4, 2020, 11 pages.
"Notice of Allowance", U.S. Appl. No. 14/599,954, dated May 24, 2017, 11 pages.
"Notice of Allowance", U.S. Appl. No. 16/153,395, dated Feb. 20, 2020, 13 Pages.
"Notice of Allowance", U.S. Appl. No. 15/917,238, dated Aug. 21, 2019, 13 pages.
"Notice of Allowance", U.S. Appl. No. 15/287,253, dated Aug. 26, 2019, 13 Pages.
"Notice of Allowance", U.S. Appl. No. 15/286,512, dated Apr. 9, 2019, 14 pages.
"Notice of Allowance", U.S. Appl. No. 14/312,486, dated Oct. 7, 2016, 15 pages.
"Notice of Allowance", U.S. Appl. No. 16/401,611, dated Jun. 10, 2020, 17 Pages.
"Notice of Allowance", U.S. Appl. No. 15/287,308, dated Jul. 17, 2019, 17 Pages.
"Notice of Allowance", U.S. Appl. No. No. 14/504,038, dated Aug. 7, 2017, 17 pages.
"Notice of Allowance", U.S. Appl. No. 15/403,066, dated Jan. 8, 2018, 18 pages.
"Notice of Allowance", U.S. Appl. No. 15/287,200, dated Nov. 6, 2018, 19 pages.
"Notice of Allowance", U.S. Appl. No. 15/286,152, dated Mar. 5, 2019, 23 pages.
"Notice of Allowance", U.S. Appl. No. 16/356,748, dated Feb. 11, 2020, 5 Pages.
"Notice of Allowance", U.S. Appl. No. 14/715,793, dated Jul. 6, 2018, 5 pages.
"Notice of Allowance", U.S. Appl. No. 17/005,207, dated Jul. 14, 2021, 5 pages.
"Notice of Allowance", U.S. Appl. No. 15/093,533, dated Jul. 16, 2020, 5 Pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.
"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 14/582,896, dated Nov. 7, 2016, 5 pages.
"Notice of Allowance", U.S. Appl. No. 15/703,511, dated Apr. 16, 2019, 5 pages.
"Notice of Allowance", U.S. Appl. No. 15/586,174, dated Sep. 24, 2018, 5 pages.
"Notice of Allowance", U.S. Appl. No. 15/287,359, dated Apr. 14, 2021, 7 pages.
"Notice of Allowance", U.S. Appl. No. 14/513,875, dated Jun. 28, 2017, 7 pages.
"Notice of Allowance", U.S. Appl. No. 14/666,155, dated Jul. 10, 2017, 7 pages.
"Notice of Allowance", U.S. Appl. No. 15/142,471, dated Aug. 6, 2020, 7 Pages.
"Notice of Allowance", U.S. Appl. No. 16/389,402, dated Aug. 21, 2019, 7 Pages.
"Notice of Allowance", U.S. Appl. No. 16/380,245, dated Sep. 15, 2020, 7 Pages.
"Notice of Allowance", U.S. Appl. No. 15/976,518, dated Sep. 28, 2021, 7 pages.
"Notice of Allowance", U.S. Appl. No. 14/874,955, dated Oct. 20, 2017, 7 pages.
"Notice of Allowance", U.S. Appl. No. 14/504,061, dated Sep. 12, 2016, 7 pages.
"Notice of Allowance", U.S. Appl. No. 14/494,863, dated May 30, 2017, 7 pages.
"Notice of Allowance", U.S. Appl. No. 14/681,625, dated Jun. 7, 2017, 7 pages.
"Notice of Allowance", U.S. Appl. No. 15/286,837, dated Mar. 6, 2019, 7 pages.
"Notice of Allowance", U.S. Appl. No. 14/731,195, dated Apr. 24, 2019, 7 pages.
"Notice of Allowance", U.S. Appl. No. 14/862,409, dated Jun. 6, 2018, 7 pages.
"Notice of Allowance", U.S. Appl. No. 15/287,155, dated Jul. 25, 2019, 7 pages.
"Notice of Allowance", U.S. Appl. No. 15/462,957, dated Jan. 23, 2020, 8 Pages.
"Notice of Allowance", U.S. Appl. No. 15/791,044, dated Feb. 12, 2020, 8 Pages.
"Notice of Allowance", U.S. Appl. No. 14/504,121, dated Jun. 1, 2021, 8 pages.
"Notice of Allowance", U.S. Appl. No. 16/503,234, dated Jun. 11, 2021, 8 pages.
"Notice of Allowance", U.S. Appl. No. 16/252,477, dated Jun. 24, 2020, 8 Pages.
"Notice of Allowance", U.S. Appl. No. 16/843,813, dated Jun. 30, 2021, 8 pages.
"Notice of Allowance", U.S. Appl. No. 15/362,359, dated Aug. 3, 2018, 8 pages.
"Notice of Allowance", U.S. Appl. No. 17/148,374, dated Oct. 14, 2021, 8 pages.
"Notice of Allowance", U.S. Appl. No. 16/560,085, dated Oct. 19, 2020, 8 pages.
"Notice of Allowance", U.S. Appl. No. 14/681,625, dated Oct. 23, 2017, 8 pages.
"Notice of Allowance", U.S. Appl. No. 14/874,955, dated Oct. 4, 2018, 8 pages.
"Notice of Allowance", U.S. Appl. No. 15/398,147, dated Nov. 15, 2017, 8 pages.
"Notice of Allowance", U.S. Appl. No. 16/669,842, dated Dec. 18, 2020, 8 pages.
"Notice of Allowance", U.S. Appl. No. 14/959,730, dated Feb. 22, 2018, 8 pages.
"Notice of Allowance", U.S. Appl. No. 15/142,829, dated Feb. 6, 2019, 8 pages.
"Notice of Allowance", U.S. Appl. No. 14/930,220, dated Feb. 2, 2017, 8 pages.
"Notice of Allowance", U.S. Appl. No. 15/352,194, dated Jun. 26, 2019, 8 pages.
"Notice of Allowance", U.S. Appl. No. 15/595,649, dated Sep. 14, 2018, 8 pages.
"Notice of Allowance", U.S. Appl. No. 16/563,124, dated Jul. 8, 2021, 9 pages.
"Notice of Allowance", U.S. Appl. No. 15/343,067, dated Jul. 27, 2017, 9 pages.

(56) References Cited

OTHER PUBLICATIONS

"Notice of Allowance", U.S. Appl. No. 16/822,601, dated Aug. 5, 2021, 9 pages.
"Notice of Allowance", U.S. Appl. No. 16/689,519, dated Sep. 30, 2021, 9 pages.
"Notice of Allowance", U.S. Appl. No. 16/356,748, dated Oct. 17, 2019, 9 Pages.
"Notice of Allowance", U.S. Appl. No. 15/142,689, dated Oct. 30, 2018, 9 pages.
"Notice of Allowance", U.S. Appl. No. 14/504,137, dated Feb. 6, 2019, 9 pages.
"Notice of Allowance", U.S. Appl. No. 14/599,954, dated Mar. 15, 2018, 9 pages.
"Notice of Allowance", U.S. Appl. No. 15/142,619, dated Aug. 13, 2018, 9 pages.
"Patent Board Decision", U.S. Appl. No. 14/504,121, dated May 20, 20201, 9 pages.
"Philips Vital Signs Camera", Retrieved From: http://www.vitalsignscamera.com/> Apr. 15, 2015, Jul. 17, 2013, 2 pages.
"Pre-Interview Communication", U.S. Appl. No. 15/287,359, dated Jul. 24, 2018, 2 pages.
"Pre-Interview Communication", U.S. Appl. No. 16/380,245, dated Jun. 15, 2020, 3 Pages.
"Pre-Interview Communication", U.S. Appl. No. 16/080,293, dated Jun. 25, 2020, 3 Pages.
"Pre-Interview Communication", U.S. Appl. No. 14/513,875, dated Oct. 21, 2016, 3 pages.
"Pre-Interview Communication", U.S. Appl. No. 15/142,471, dated Dec. 12, 2018, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Communication", U.S. Appl. No. 15/343,067, dated Apr. 19, 2017, 3 pages.
"Pre-Interview Communication", U.S. Appl. No. 16/401,611, dated Apr. 13, 2020, 4 Pages.
"Pre-Interview Communication", U.S. Appl. No. 15/286,495, dated Sep. 10, 2018, 4 pages.
"Pre-Interview Communication", U.S. Appl. No. 14/959,901, dated Feb. 10, 2017, 4 pages.
"Pre-Interview Communication", U.S. Appl. No. 14/959,730, dated Feb. 15, 2017, 4 pages.
"Pre-Interview Communication", U.S. Appl. No. 15/362,359, dated May 17, 2018, 4 pages.
"Pre-Interview Communication", U.S. Appl. No. 15/703,511, dated Feb. 11, 2019, 5 pages.
"Pre-Interview Communication", U.S. Appl. No. 14/494,863, dated Jan. 27, 2017, 5 pages.
"Pre-Interview Communication", U.S. Appl. No. 15/917,238, dated May 1, 2019, 6 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Pre-Interview Office Action", U.S. Appl. No. 14/862,409, dated Sep. 15, 2017, 16 pages.
"Pre-Interview Office Action", U.S. Appl. No. 14/731,195, dated Dec. 20, 2017, 4 pages.
"Preliminary Report on Patentability", PCT Application No. PCT/US2016/034366, dated Dec. 7, 2017, 10 pages.
"Preliminary Report on Patentability", PCT Application No. PCT/US2016/030177, dated Oct. 31, 2017, 11 pages.
"Preliminary Report on Patentability", PCT Application No. PCT/US2016/030115, dated Oct. 31, 2017, 15 pages.
"Preliminary Report on Patentability", PCT Application No. PCT/US2016/030185, dated Nov. 9, 2017, 16 pages.
"Preliminary Report on Patentability", Application No. PCT/US2016/065295, dated Jul. 24, 2018, 18 pages.
"Preliminary Report on Patentability", PCT Application No. PCT/US2016/042013, dated Jan. 30, 2018, 7 pages.
"Preliminary Report on Patentability", PCT Application No. PCT/US2016/062082, dated Nov. 15, 2018, 8 pages.
"Preliminary Report on Patentability", PCT Application No. PCT/US2016/055671, dated Apr. 10, 2018, 9 pages.
"Preliminary Report on Patentability", PCT Application No. PCT/US2016/032307, dated Dec. 7, 2017, 9 pages.
"Pressure-Volume Loop Analysis in Cardiology", retrieved from https://en.wikipedia.org/w/index.php?t itle=Pressure-volume loop analysis in card iology&oldid=636928657 on Sep. 23, 2017; Obtained per link provided in search report from PCT/US2016/01398 dated Jul. 28, 2016, Dec. 6 2014, 10 pages.
"Restriction Requirement", U.S. Appl. No. 15/976,518, dated Jul. 9, 2020, 5 Pages.
"Restriction Requirement", U.S. Appl. No. 15/362,359, dated Jan. 8, 2018, 5 pages.
"Restriction Requirement", U.S. Appl. No. 14/666,155, dated Jul. 22, 2016, 5 pages.
"Restriction Requirement", U.S. Appl. No. 15/462,957, dated Jan. 4, 2019, 6 pages.
"Restriction Requirement", U.S. Appl. No. 16/563,124, dated Apr. 5, 2021, 7 pages.
"Restriction Requirement", U.S. Appl. No. 15/352,194, dated Feb. 6, 2019, 8 pages.
"Restriction Requirement", U.S. Appl. No. 15/286,537, dated Aug. 27, 2018, 8 pages.
"Samsung Galaxy S4 Air Gestures", Video retrieved from https://www.youtube.com/watch?v=375Hb87yGcg, May 7, 2013, 4 pages.
"Search Report", GB Application No. 2007255.9, dated Jul. 6, 2020, 1 page.
"Textile Wire Brochure", Retrieved at: http://www.textile-wire.ch/en/home.html, Aug. 7, 2004, 17 pages.
"The Dash smart earbuds play back music, and monitor your workout", Retrieved from < http://newatlas.com/bragi-dash-tracking-earbuds/30808/>, Feb. 13, 2014, 3 pages.
"The Instant Blood Pressure app estimates blood pressure with your smartphone and our algorithm", Retrieved at: http://www.instantbloodpressure.com/—on Jun. 23, 2016, 6 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 2018, 4 pages.
"Written Opinion", PCT Application No. PCT/US2016/030185, dated Nov. 3, 2016, 15 pages.
"Written Opinion", PCT Application No. PCT/US2017/032733, dated Jul. 24, 2017, 5 pages.
"Written Opinion", Application No. PCT/US2017/032733, dated Jul. 26, 2017, 5 pages.
"Written Opinion", Application No. PCT/US2016/042013, dated Feb. 2, 2017, 6 pages.
"Written Opinion", PCT Application No. PCT/US2016/060399, dated May 11, 2017, 6 pages.
"Written Opinion", Application No. PCT/US2016/026756, dated Nov. 10, 2016, 7 pages.
"Written Opinion", PCT Application No. PCT/US2016/055671, dated Apr. 13, 2017, 8 pages.
"Written Opinion", Application No. PCT/US2016/065295, dated Apr. 13, 2018, 8 pages.
"Written Opinion", PCT Application No. PCT/US2017/051663, dated Oct. 12, 2018, 8 pages.
"Written Opinion", Application No. PCT/US2016/013968, dated Jul. 28, 2016, 9 pages.
"Written Opinion", PCT Application No. PCT/US2016/030177, dated Nov. 3, 2016, 9 pages.
Amihood, Patrick M. et al., "Closed-Loop Manufacturing System Using Radar", Technical Disclosure Commons; Retrieved from http://www.tdcommons.org/dpubs_series/464, Apr. 17, 2017, 8 pages.
Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.

(56) References Cited

OTHER PUBLICATIONS

Arbabian, Amin et al., "A 94GHz mm-Wave to Baseband Pulsed-Radar for Imaging and Gesture Recognition", Apr. 4, 2013, pp. 1055-1071.
Azevedo, Stephen et al., "Micropower Impulse Radar", Science & Technology Review, Feb. 29, 1996, pp. 16-29, Feb. 29, 2096, 7 pages.
Badawy, Wael "System on Chip", Section 1.1 "Real-Time Applications" Springer Science & Business Media,, 2003, 14 pages.
Balakrishnan, Guha et al., "Detecting Pulse from Head Motions in Video", In Proceedings: CVPR '13 Proceedings of the Conference on Computer Vision and Pattern Recognition, Jun. 23, 2013, 8 pages.
Bondade, Rajdeep et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Cheng, Jingyuan "Smart Textiles: From Niche to Mainstream", IEEE Pervasive Computing, Jul. 2013, pp. 81-84.
Couderc, Jean-Philippe et al., "Detection of Atrial Fibrillation using Contactless Facial Video Monitoring", in Proceedings: Heart Rhythm Society, vol. 12, Issue 1 Available at: <http://www.heartrhythmjournal.com/article/S1547-5271(14)00924-2/pdf>, 7 pages.
Dias, T et al., "Capacitive Fibre-Meshed Transducer for Touch & Proximity Sensing Applications", IEEE Sensors Journal, IEEE Service Center, New York, NY, US, vol. 5, No. 5, Oct. 1, 2005 (Oct. 1, 2005), pp. 989-994, XP011138559, ISSN: 1530-437X, DOI: 10.1109/JSEN.2005.844327, 5 pages.
Duncan, David P. "Motion Compensation of Synthetic Aperture Radar", Microwave Earth Remote Sensing Laboratory, Brigham Young University, Apr. 15, 2003, 5 pages.
Espina, Javier et al., "Wireless Body Sensor Network for Continuous Cuff-less Blood Pressure Monitoring", International Summer School on Medical Devices and Biosensors, 2006, 5 pages.
Fan, Tenglong et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016, pp. 4012-4012, XP011633246, ISSN: 0018-9480, DOI: 10.1109/TMTT.2016.2610427.
Farringdon, Jonny et al., "Wearable Sensor Badge & Sensor Jacket for Context Awareness", Third International Symposium on Wearable Computers, Sep. 2000, 7 pages.
Felch, Andrew et al., "Standard Radar API: Proposal Version 0.1", Technical Disclosure Commons, Jan. 24, 2021, 18 pages.
Garmatyuk, Dmitriy S. et al., "Ultra-Wideband Continuous-Wave Random Noise Arc-SAR", IEEE Transaction on Geoscience and Remote Sensing, vol. 40, No. 12, Dec. 2002, 10 pages.
Geisheimer, Jonathan L. et al., "A Continuous-Wave (CW) Radar for Gait Analysis", IEEE, 2001, 5 pages.
Godana, Bruhtesfa E. "Human Movement Characterization in Indoor Environment using GNU Radio Based Radar", Nov. 30, 2009, 100 pages.
Guerra, Anna et al., "Millimeter-Wave Personal Radars for 3D Environment Mapping", 48th Asilomar Conference on Signals, Systems and Computer, Nov. 2014, pp. 701-705.
Gorboz, Sevgi Z. et al., "Detection and Identification of Human Targets in Radar Data", Proc. SPIE 6567, Signal Processing, Sensor Fusion, and Target Recognition XVI, 656701, May 7, 2007, 12 pages.
He, David D. "A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221, 137 pages.
Holleis, Paul et al., "Evaluating Capacitive Touch Input on Clothes", Proceedings of the 10th International Conference on Human Computer Interaction, Jan. 1, 2008, 10 pages.
Holleis, Paul et al., "Evaluating Capacitive Touch Input on Clothes", Proceedings of the 10th International Conference on Human Computer Interaction With Mobile Devices and Services, p. 81, XP055223937, New York, NY, US; DOI: 10.1145/1409240.1409250; ISBN: 978-1-59593-952-4, Jan. 1, 2008, 11 pages.
Hollington, Jessie "Playing back all songs on iPod", retrieved at: https://www.ilounge.com/index.php/articles/comments/playing-back-all-songs-on-ipod, Aug. 22, 2008, 2 pages.
Ishijima, Masa "Unobtrusive Approaches to Monitoring Vital Signs at Home", Medical & Biological Engineering and Computing, Springer, Berlin, DE, vol. 45, No. 11 as cited in search report for PCT/US2016/013968 on Jul. 28, 2016, Sep. 26, 2007, 3 pages.
Karagozler, Mustafa E. et al., "Embedding Radars in Robots to Accurately Measure Motion", Technical Disclosure Commons; Retrieved from http://www.tdcommons.org/dpubs_series/454, Mar. 30, 2017, 8 pages.
Klabunde, Richard E. "Ventricular Pressure-vol. Loop Changes in Valve Disease", Retrieved From <https://web.archive.org/web/20101201185256/http://cvphysiology.com/Heart%20Disease/HD009.htm>, Dec. 1, 2010, 8 pages.
Kubota, Yusuke et al., "A Gesture Recognition Approach by using Microwave Doppler Sensors", IPSJ SIG Technical Report, 2009 (6), Information Processing Society of Japan, Apr. 15, 2010, 12 pages.
Lee, Cullen E. "Computing the Apparent Centroid of Radar Targets", Sandia National Laboratories; Presented at the Proceedings of the 1996 IEEE National Radar Conference: Held at the University of Michigan, May 1996, 21 pages.
Lien, Jaime et al., "Embedding Radars in Robots for Safety and Obstacle Detection", Technical Disclosure Commons; Retrieved from http://www.tdcommons.org/dpubs_series/455, Apr. 2, 2017, 10 pages.
Lien, Jaime et al., "Soli: Ubiquitous Gesture Sensing with Millimeter Wave Radar", ACM Transactions on Graphics (TOG), ACM, US, vol. 35, No. 4, XP058275791, ISSN: 0730-0301, DOI: 10.1145/2897824.2925953, Jul. 11, 2016, 19 pages.
Martinez-Garcia, Hermino et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016)pp. 151-160, XP035898949, ISSN: 0925-1030, DOI: 10.1007/S10470-016-0747-8, Apr. 23, 2016, 10 pages.
Matthews, Robert J. "Venous Pulse", Retrieved at: http://www.rjmatthewsmd.com/Definitions/venous_pulse.htm—on Nov. 30, 2016, Apr. 13, 2013, 7 pages.
Nakajima, Kazuki et al., "Development of Real-Time Image Sequence Analysis for Evaluating Posture Change and Respiratory Rate of a Subject in Bed", In Proceedings: Physiological Measurement, vol. 22, No. 3; Retrieved From: <http://iopscience.iop.org/0967-3334/22/3/401/pdf/0967-3334_22_3_401.pdf> Feb. 27, 2015, 8 pages.
Narasimhan, Shar "Combining Self- & Mutual-Capacitive Sensing for Distinct User Advantages", Retrieved from the Internet: URL:http://www.designnews.com/author.asp?section_id=1365&doc_id=271356&print=yes [retrieved on Oct. 1, 2015], Jan. 31, 2014, 5 pages.
Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.
Palese, et al., "The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, Jan. 1, 2013, pp. 8-12.
Patel, P C. et al., "Applications of Electrically Conductive Yarns in Technical Textiles", International Conference on Power System Technology (POWECON), Oct. 30, 2012, 6 pages.
Poh, Ming-Zher et al., "A Medical Mirror for Non-contact Health Monitoring", In Proceedings: ACM SIGGRAPH Emerging Technologies, Jan. 1, 2011, 1 page.
Poh, Ming-Zher et al., "Non-contact, Automated Cardiac Pulse Measurements Using Video Imaging and Blind Source Separation.", In Proceedings: Optics Express, vol. 18, No. 10, May 7, 2010, 13 pages.
Pu, Qifan et al., "Gesture Recognition Using Wireless Signals", Oct. 2014, pp. 15-18.

(56) References Cited

OTHER PUBLICATIONS

Pu, Qifan et al., "Whole-Home Gesture Recognition Using Wireless Signals", MobiCom'13, Sep. 30-Oct. 4, Miami, FL, USA, Sep. 2013, 12 pages.

Pu, Qifan et al., "Whole-Home Gesture Recognition Using Wireless Signals", MobiCom'13, Sep. 30-Oct. 4, Miami, FL, USA, 2013, 12 pages.

Pu, Qifan et al., "Whole-Home Gesture Recognition Using Wireless Signals", Proceedings of the 19th annual international conference on Mobile computing & networking (MobiCom'13), US, ACM, Sep. 30, 2013, pp. 27-38, Sep. 30, 2013, 12 pages.

Pu, Quifan et al., "Whole-Home Gesture Recognition Using Wireless Signals", MobiCom '13 Proceedings of the 19th annual international conference on Mobile computing & networking, Aug. 27, 2013, 12 pages.

Schneegass, Stefan et al., "Towards a Garment OS: Supporting Application Development for Smart Garments", Wearable Computers, ACM, Sep. 13, 2014, 6 pages.

Skolnik, Merrill I. "CW and Frequency-Modulated Radar", In: "Introduction to Radar Systems", McGraw Hill, XP055047545, ISBN: 978-0-07-057909-5 pp. 68-100, p. 95-p. 97, Jan. 1, 1981, 18 pages.

Stoppa, Matted "Wearable Electronics and Smart Textiles: A Critical Review", In Proceedings of Sensors, vol. 14, Issue 7, Jul. 7, 2014, pp. 11957-11992.

Wang, Wenjin et al., "Exploiting Spatial Redundancy of Image Sensor for Motion Robust rPPG", In Proceedings: IEEE Transactions on Biomedical Engineering, vol. 62, Issue 2, Jan. 19, 2015, 11 pages.

Wang, Yazhou et al., "Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.

Wijesiriwardana, R et al., "Capacitive Fibre-Meshed Transducer for Touch & Proximity Sensing Applications", IEEE Sensors Journal, IEEE Service Center, Oct. 1, 2005, 5 pages.

Zhadobov, Maxim et al., "Millimeter-Wave Interactions with the Human Body: State of Knowledge and Recent Advances", International Journal of Microwave and Wireless Technologies, p. 1 of 11; Cambridge University Press and the European Microwave Association, doi:10.1017/51759078711000122, 2011.

Zhadobov, Maxim et al., "Millimeter-wave Interactions with the Human Body: State of Knowledge and Recent Advances", International Journal of Microwave and Wireless Technologies, Mar. 1, 2011, 11 pages.

Zhang, Ruquan et al., "Study of the Structural Design and Capacitance Characteristics of Fabric Sensor", Advanced Materials Research (vols. 194-196), Feb. 21, 2011, 8 pages.

Zheng, Chuan et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, XP032574214, DOI: 10.1109/IMWS-B10.2013.6756200, Dec. 9, 2013, 3 Pages.

RADAR RECOGNITION-AIDED SEARCH

RELATED APPLICATIONS

This application is a continuation of and claims priority to U.S. Utility patent application Ser. No. 14/504,121, filed on Oct. 1, 2014, which in turn claims priority under 35 U.S.C. § 119(e) to U.S. Provisional Patent Application No. 62/040,925, filed on Aug. 22, 2014, the disclosure of which are incorporated in their entireties by reference herein.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Computer-aided searches are not only commonplace for billions of people, they are nearly essential in many people's day-to-day lives. Because of this, conventional search techniques use complex search algorithms to provide search results that are better and better tailored to what a person seeks when they enter a query for their search.

Even with these complex search algorithms, however, conventional search techniques can fail to provide a desired result. This can be due to a lack of information, such as when a person enters few or ambiguous search terms for a query. If a person enters a search query of "Best Italian Restaurant" the search algorithm may not know enough information to best perform the search—does the person mean within 10 kilometers of his current location? His hometown? At a city he will be visiting next week? Or does he want the best Italian Restaurant within some price limit? For these and other reasons, current techniques for performing computer-aided searches can fail to provide desired results.

SUMMARY

This document describes techniques and devices for a radar recognition-aided search. Through use of a radar-based recognition system, gestures made by, and physiological information about, persons can be determined. In the case of physiological information, the techniques can use this information to refine a search. For example, if a person requests a search for a coffee shop, the techniques may refine the search to coffee shops in the direction that the person is walking. In the case of a gesture, the techniques may refine or base a search solely on the gesture. Thus, a search for information about a store, car, or tree can be made responsive to a gesture pointing at the store, car, or tree with or without explicit entry of a search query.

This summary is provided to introduce simplified concepts concerning radar recognition-aided searches, which are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices enabling radar recognition-aided searches are described with reference to the following drawings. The same numbers are used throughout the drawings to reference like features and components.

DETAILED DESCRIPTION

Overview

This document describes techniques enabling radar recognition-aided searches. These techniques enable improved computer-aided searches through additional information provided by radar-recognized gestures and physiological information. The radar-based recognition system described herein permits recognition of a great breadth of gestures and physiological information and in a robust set of circumstances. The techniques, along with the radar-based recognition system, enable improved computer-aided searches and, in some cases, searches enabled with little or no explicit entry of a search query.

Consider, for example, a case where a person is watching a television program on a computing device. Assume that the person sees a car being driven during the television program. The techniques described herein permit the user, with as little as an audio statement of "what kind of car is that?" or even "what is that?" and a gesture pointing at the television screen, to receive search results for the particular car shown on the television.

Consider, as another example, a case where a person is standing on a corner in a city and requests a search for a best Indian restaurant and concurrently makes a sweeping gesture having about a 90-degree arc. The techniques may provide search results tailored to city blocks within that 90-degree arc that are within a reasonable distance from the person. Further still, the reasonable distance can be tailored to physiological information determined for the person as well, such as information indicating that the person is hungry or dehydrated.

This document now turns to an example environment, after which example radar-based recognition systems and radar fields, example methods, and an example computing system are described.

Example Environment

Figure 1:
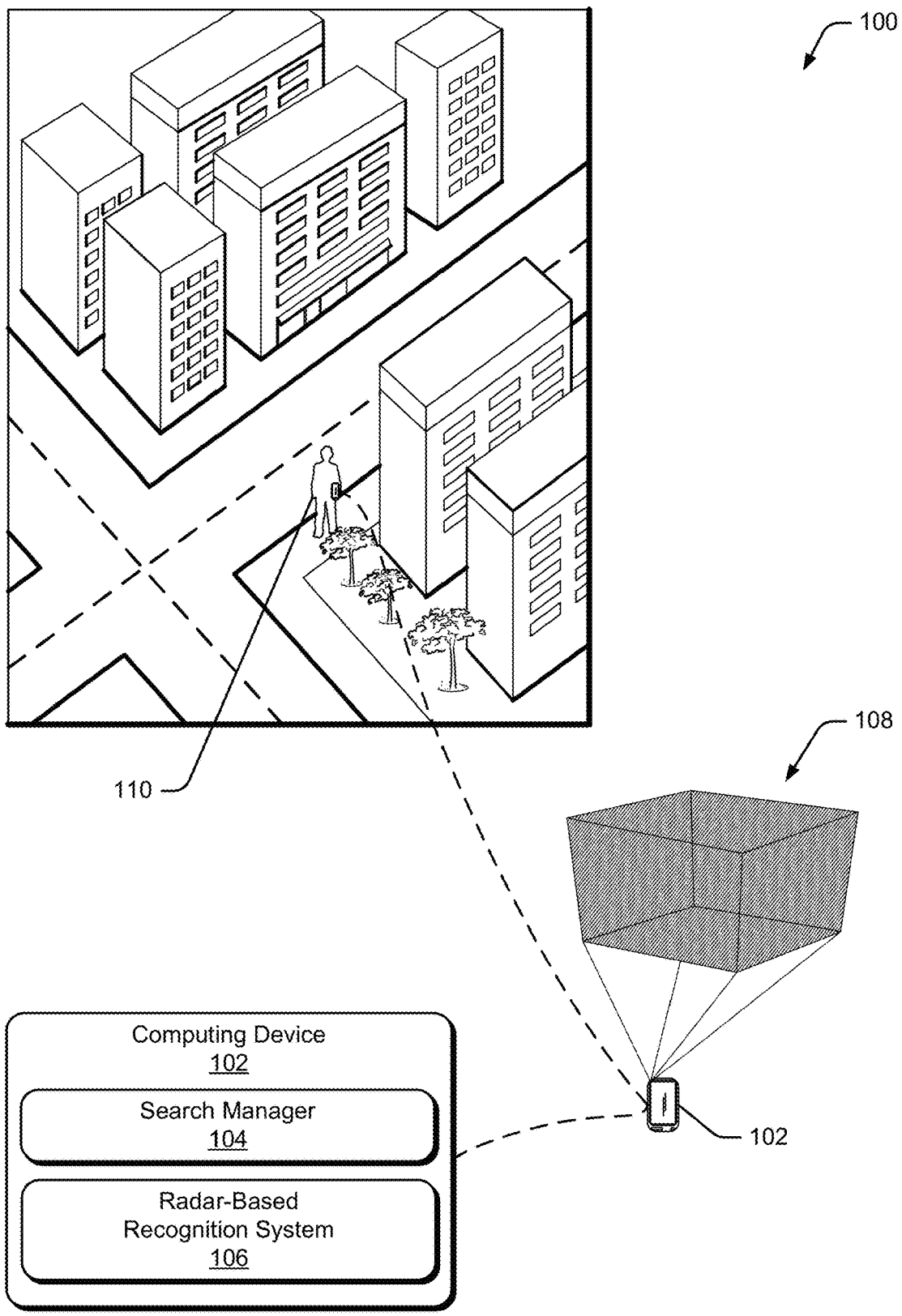
FIG. 1 illustrates an example environment in which a radar recognition-aided search can be implemented.

FIG. 1 is an illustration of example environment 100 in which techniques enabling radar recognition-aided searches and an apparatus including a radar-based recognition system may be embodied. Environment 100 includes an example computing device 102 having a search manager 104 and a radar-based recognition system 106. Radar-based recognition system 106 provides a radar field 108 configured to recognize gestures or physiological information of person 110. Search manager 104 searches based on information about person 110 or a gesture made by person 110, and in some cases also based on a search query selected by person 110.

Figure 2:
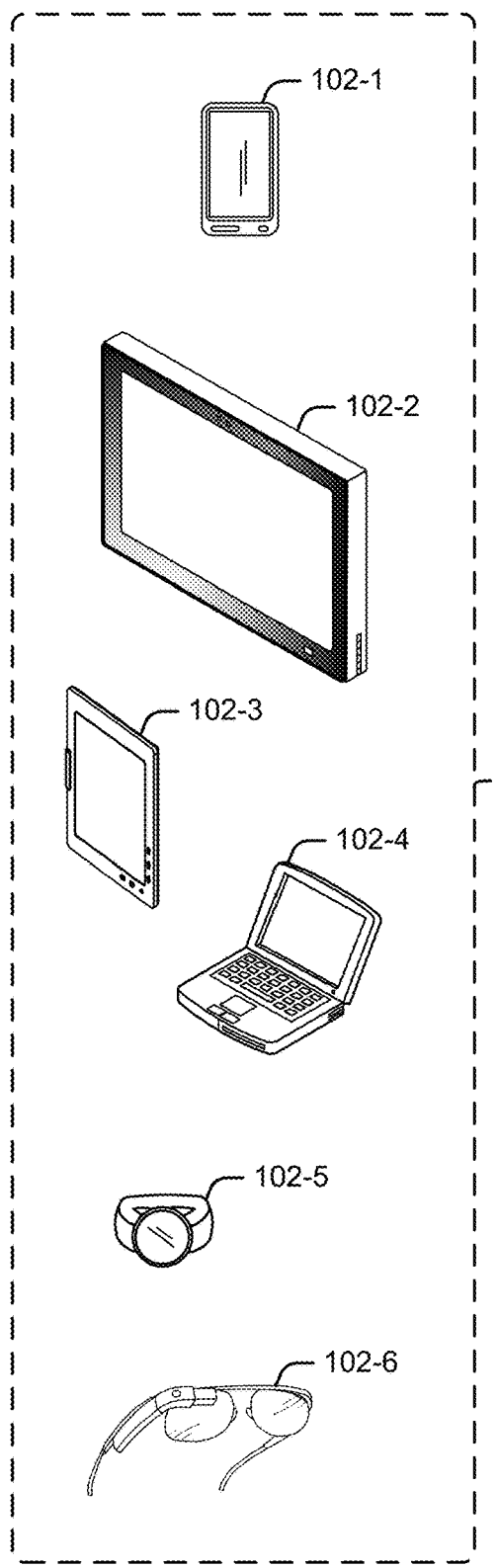
FIG. 2 illustrates the radar-based recognition system and computing device of FIG. 1 in detail.
Figure 2:
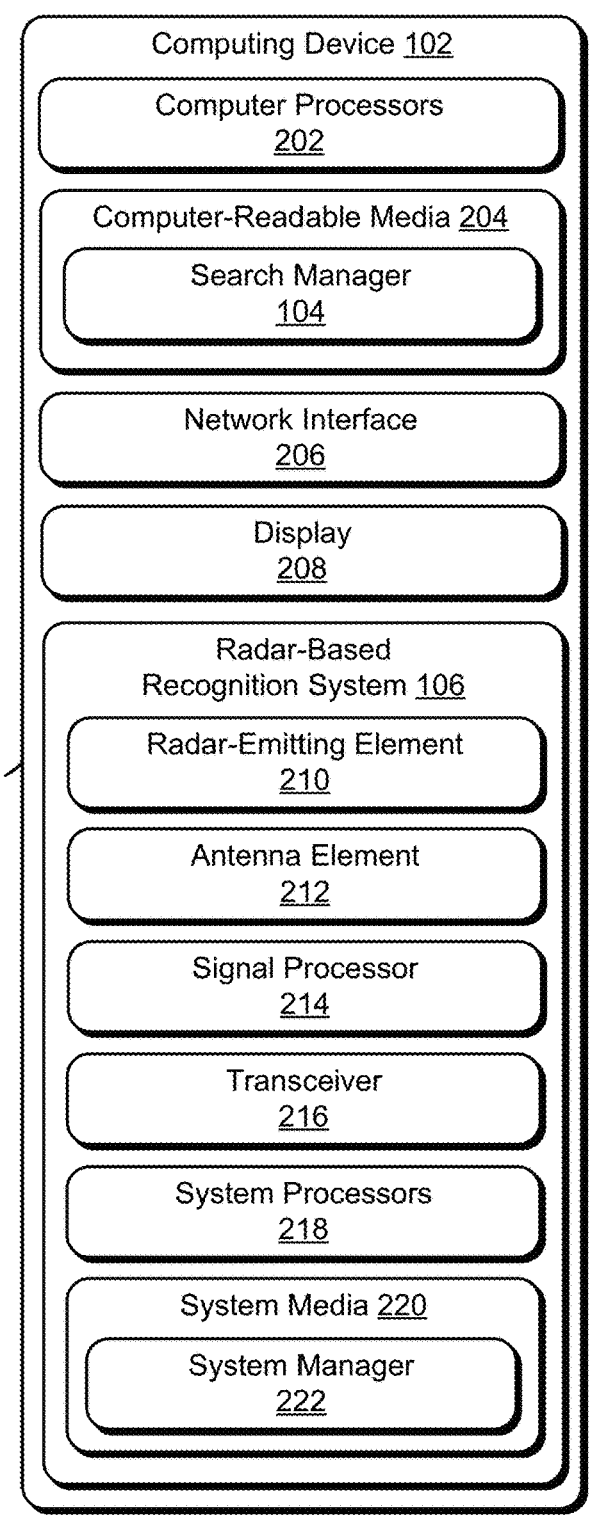

Example configurations of computing device 102 are shown in FIG. 2, which depicts search manager 104, radar-based recognition system 106, and other components of computing device 102 in greater detail. Here, computing device 102 is illustrated as various non-limiting example devices: smartphone 102-1, television 102-2, tablet 102-3, laptop 102-4, computing bracelet 102-5, and computing spectacles 102-6, though other devices may also be used, such as home automation and control systems, entertainment systems, audio systems, desktop computers, other home appliances, security systems, netbooks, smartphones, and e-readers. Note that computing device 102 can be wearable, non-wearable but mobile, or relatively immobile (e.g., desktops and appliances). Note also that radar-based recognition system 106 can be used with, or embedded within, many different computing devices or peripherals, such as in automobiles or as an attachment to a laptop computer.

Further, radar field 108 can be invisible and penetrate some materials, such as textiles, thereby further expanding how the radar-based recognition system 106 can be used and embodied, e.g., to determine a person's heart rate or a gesture made wearing gloves or with an occlusion between radar-based recognition system 106 and the person's hands. While examples shown herein generally show one radar-based recognition system 106 per device, multiples can be used, thereby increasing a number and complexity of gestures and physiological information, as well as resolution, accuracy, and robust recognition.

Computing device 102 includes one or more computer processors 202 and computer-readable media 204, which includes memory media and storage media. Applications and/or an operating system (not shown) embodied as computer-readable instructions on computer-readable media 204 can be executed by processors 202 to provide some of the functionalities described herein. Computer-readable media 204 also includes search manager 104.

Computing device 102 may also include network interfaces 206 for communicating data over wired, wireless, or optical networks and display 208. By way of example and not limitation, network interface 206 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Radar-based recognition system 106, as noted above, is configured to recognize gestures and determine physiological information. To enable this, radar-based recognition system 106 includes a radar-emitting element 210, an antenna element 212, and a signal processor 214. Generally, radar-emitting element 210 is configured to provide a radar field, in some cases one that is configured to penetrate fabric or other obstructions and reflect from human tissue. These fabrics or obstructions can include wood, glass, plastic, cotton, wool, nylon and similar fibers, and so forth, while reflecting from human tissues, such as a person's hand.

This radar field can be a small size, such as about one millimeter to 1.5 meters, or an intermediate size, such as about one to about 30 meters. In the intermediate size, antenna element 212 and signal processor 214 are configured to receive and process reflections of the radar field to provide large-body gestures based on reflections from human tissue caused by body, arm, or leg movements, though smaller and more-precise gestures can be sensed as well. Example intermediate-sized radar fields include those in which a user makes a gesture to point in a direction or at an object on a television.

Radar-emitting element 210 can instead be configured to provide a radar field that is relatively small. Radar field 108 as illustrated in FIG. 1 is one such relatively small field, and is configured for sensing gestures and physiological information for a person in contact with a mobile computing device, such as computing bracelet 102-5.

Radar-emitting element 210 can be configured to emit continuously modulated radiation, ultra-wideband radiation, or sub-millimeter-frequency radiation. Radar-emitting element 210, in some cases, is configured to form radiation in beams, the beams aiding antenna element 212 and signal processor 214 to determine which of the beams are interrupted, and thus locations of interactions (e.g., human skin) within the radar field.

Antenna element 212 is configured to receive reflections of, or sense interactions in, the radar field. In some cases, reflections include those from human tissue that is within the radar field, such as skin on a person's arm to determine the person's temperature, or a hand or finger movement to perform a gesture. Antenna element 212 can include one or many antennas or sensors, such as an array of radiation sensors, the number in the array based on a desired resolution and whether the field is a surface or volume.

Signal processor 214 is configured to process the received reflections within the radar field to aid in determining a gesture or physiological information. Antenna element 212 may, in some cases, be configured to receive reflections from multiple human tissue targets that are within the radar field and signal processor 214 be configured to process the received interactions sufficient to differentiate one of the multiple human tissue targets from another of the multiple human tissue targets. These targets may include hands, arms, legs, head, and body, from a same or different person.

The field provided by radar-emitting element 210 can be a three-dimensional (3D) volume (e.g., hemisphere, cube, volumetric fan, cone, or cylinder) to sense in-the-air gestures, though a surface field (e.g., projecting on a surface of a person) can instead be used. Antenna element 212 is configured, in some cases, to receive reflections from interactions in the radar field of two or more targets (e.g., fingers, arms, or persons), and signal processor 214 is configured to process the received reflections sufficient to provide data by which to aid in the determination of gestures and/or physiological information.

To sense gestures through obstructions, radar-emitting element 210 can also be configured to emit radiation capable of substantially penetrating fabric, wood, and glass, for example. In such cases, antenna element 212 is configured to receive the reflections from the human tissue through the fabric, wood, or glass, and signal processor 214 is configured to analyze the received reflections even with the received reflections partially affected by passing through the obstruction twice. For example, the radar passes through a fabric layer interposed between the radar emitter and a human arm, reflects off the human arm, and then back through the fabric layer to the antenna element.

Radar-based recognition system 106 enables recognition of many different gestures, such as those usable with current touch-sensitive displays, e.g., swipes, two-finger pinch, spread, rotate, tap, and so forth. Other gestures are also enabled that are complex, or simple but three-dimensional, examples include the many sign-language gestures, e.g., those of American Sign Language (ASL) and other sign languages worldwide. A few examples of these are: an up-and-down fist, which in ASL means "Yes"; an open index and middle finger moving to connect to an open thumb, which means "No"; a flat hand moving up a step, which means "Advance"; a flat and angled hand moving up and down; which means "Afternoon"; clenched fingers and open thumb moving to open fingers and an open thumb, which means "taxicab"; an index finger moving up in a roughly vertical direction, which means "up"; and so forth. These are but a few of many gestures that can be sensed as well as be mapped to associated meanings, which can in turn be used to make or refine computer-aided searches.

Radar-based recognition system 106 also includes transceiver 216, which is configured to transmit gesture/physiological information to a remote device, though this may not be needed when radar-based recognition system 106 is integrated with computing device 102. When included, gesture/physiological information can be provided in a format usable by a remote computing device sufficient for the remote computing device to determine the physiological information or the information about the gesture in those cases where the gesture is not determined by radar-based recognition system 106 or computing device 102.

In more detail, radar-emitting element 210 can be configured to emit microwave radiation in a 1 GHz to 300 GHz range, a 3 GHz to 100 GHz range, and narrower bands, such as 57 GHz to 63 GHz, to provide the radar field. This range affects antenna element 212's ability to receive interactions, such as to track locations of two or more targets to a resolution of about two to about 25 millimeters. Radar-emitting element 210 can be configured, along with other entities of radar-based recognition system 106, to have a relatively fast update rate, which can aid in resolution of the interactions.

By selecting particular frequencies, radar-based recognition system 106 can operate to substantially penetrate clothing while not substantially penetrating human tissue, or penetrating human tissue differently (e.g., bone and skin). Further, antenna element 212 or signal processor 214 can be configured to differentiate between interactions in the radar field caused by clothing from those interactions in the radar field caused by human tissue, such as by analyzing variations in patterns, frequency, and/or strength of reflected signals. Thus, a person wearing gloves or a long sleeve shirt that could interfere with sensing gestures with some conventional techniques can still be sensed with radar-based recognition system 106.

Radar-based recognition system 106 may also include one or more system processors 218 and system media 220 (e.g., one or more computer-readable storage media). System media 220 includes system manager 222, which can perform various operations, including determining a gesture based on gesture data from signal processor 214, mapping the determined gesture to a pre-associated meaning, and causing transceiver 216 to transmit the meaning to an entity that performs the requested search.

These and other capabilities and configurations, as well as ways in which entities of FIGS. 1 and 2 act and interact, are set forth in greater detail below. These entities may be further divided, combined, and so on. The environment 100 of FIG. 1 and the detailed illustrations of FIGS. 2 and 8 illustrate some of many possible environments and devices capable of employing the described techniques.

Example Methods

Figure 3:
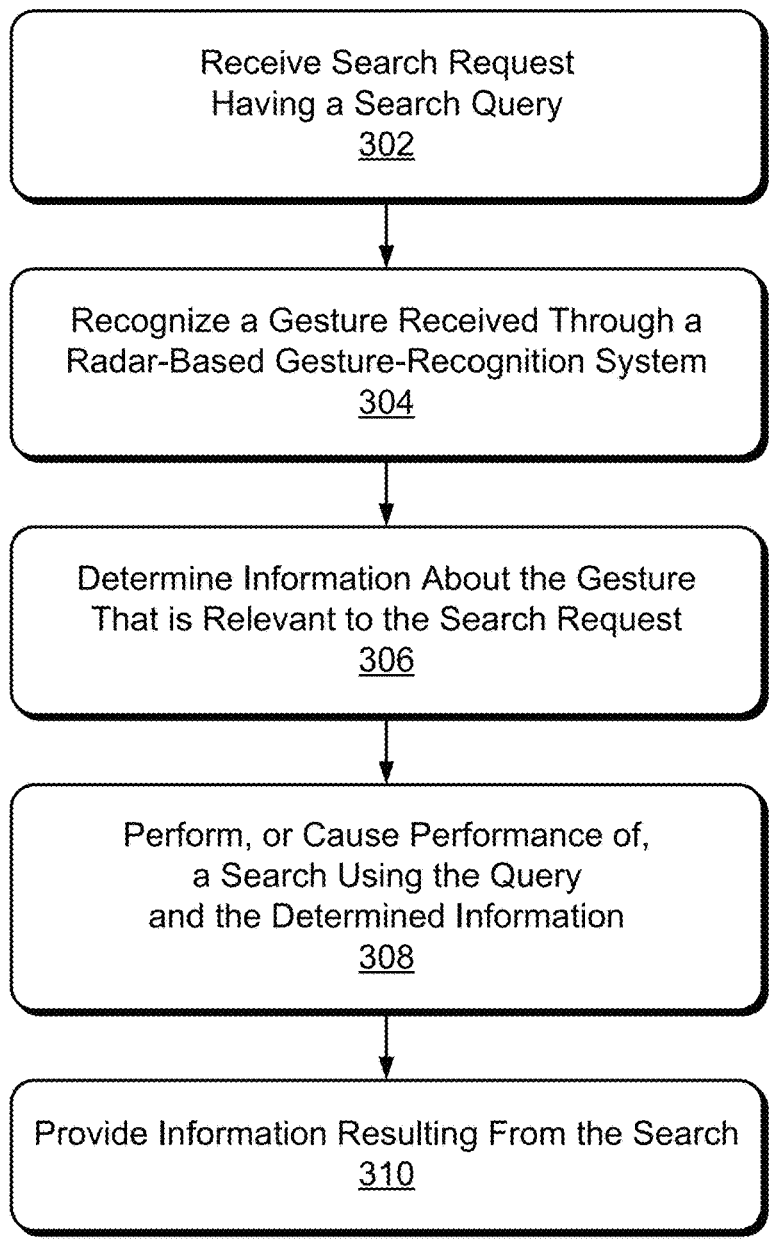
FIG. 3 illustrates an example method for performing a search using one or more search terms for a query and information about a gesture.
Figure 5:
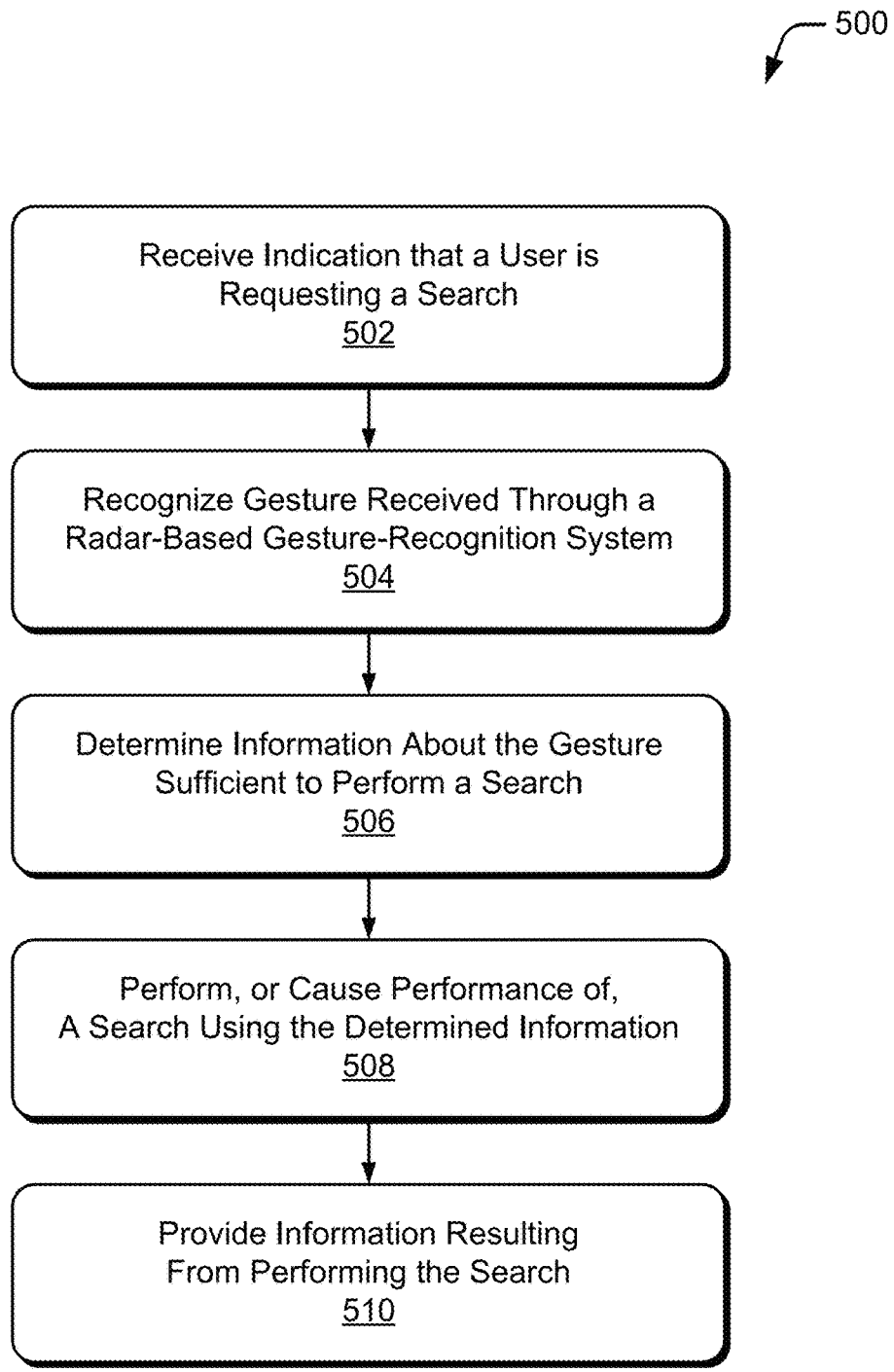
FIG. 5 illustrates an example method performing a search using information determined from a radar-recognized gesture and may or may not include a search query selected explicitly by a person.
Figure 8:
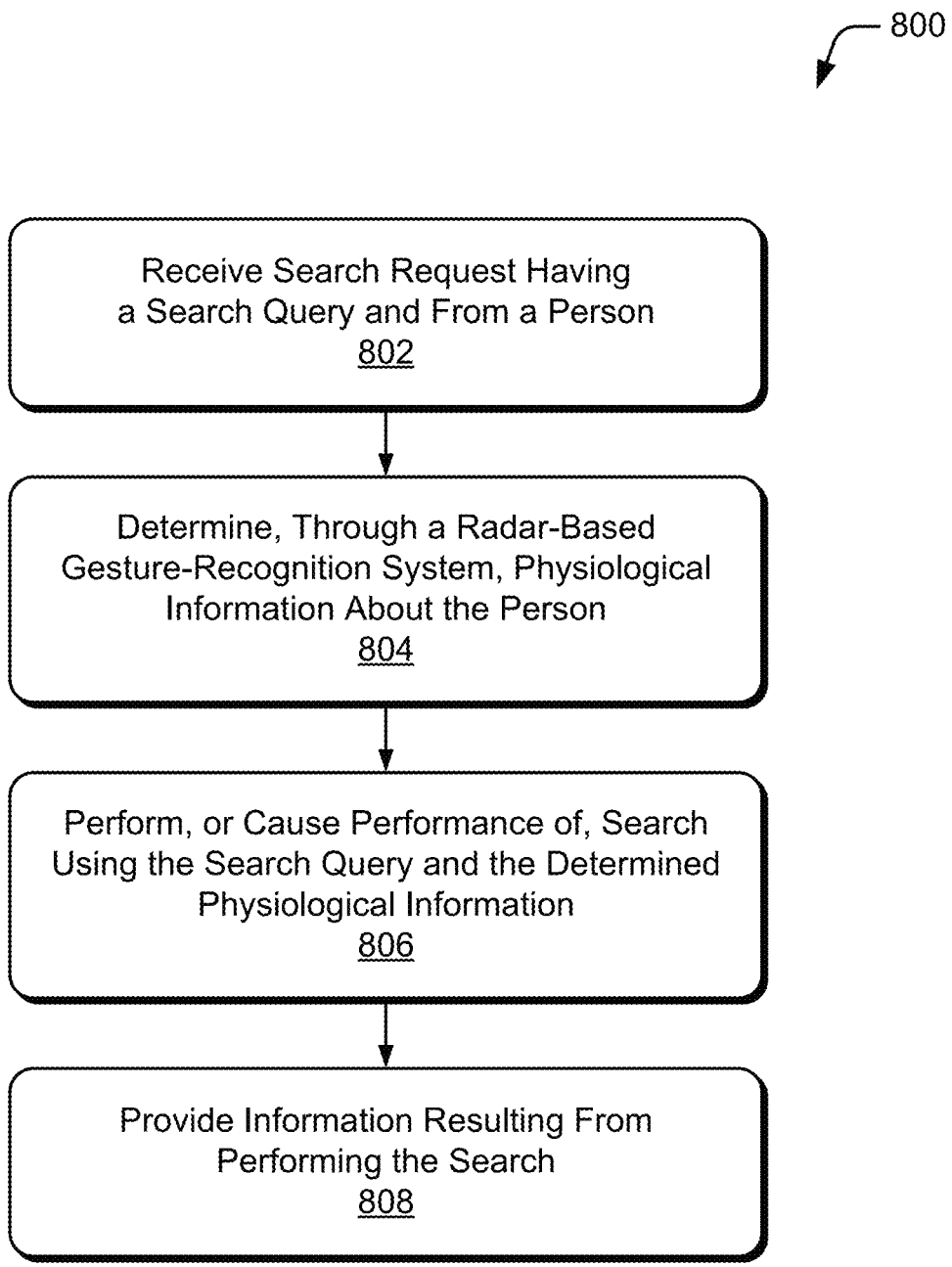
FIG. 8 illustrates an example method performing a search based on a search query and radar-determined physiological information for a person.

FIGS. 3, 5, and 8 depict methods enabling radar recognition-aided searches. Method 300 performs a search using a search query and information about a gesture. Method 500 performs a search using information determined from a radar-recognized gesture, and may or may not include a search query selected explicitly by a person. Method 800 performs a search based on a query and radar-determined physiological information for a person.

These methods and other methods herein are shown as sets of operations (or acts) performed but are not necessarily limited to the order or combinations in which the operations are shown herein. Further, any of one or more of the operations may be repeated, combined, reorganized, or linked to provide a wide array of additional and/or alternate methods. In portions of the following discussion reference may be made to environment 100 of FIG. 1 and as detailed in FIG. 2, reference to which is made for example only. The techniques are not limited to performance by one entity or multiple entities operating on one device.

At 302, a search request having a search query is received. The search request can be received in various manners, such as through an audio-reception system, a touch screen, keyboard, and so forth.

At 304, a gesture received through a radar-based recognition system is recognized. As noted above, this gesture can be received through radar-based recognition system 106 detailed above. In more detail, radar-based recognition system 106 may provide a radar field, which can be caused by one or more of search manager 104, system manager 222, or signal processor 214. Thus, system manager 222 may cause radar-emitting element 210 of radar-based recognition system 106 to provide (e.g., project or emit) one of the described radar fields noted above, after which one or more interactions by an actor (arm, hand, whole person) in the radar field are sensed via reflections received by antenna element 212. The reflections for the interaction can be processed by signal processor 214, which may provide gesture data for later determination as to the gesture intended, such as by system manager 222 or search manager 104. Note that radar-emitting element 210, antenna element 212, and signal processor 214 may act with or without processors and processor-executable instructions. Thus, radar-based recognition system 106, in some cases, can be implemented with hardware or hardware in conjunction with software and/or firmware.

At 306, information about the gesture that is relevant to the search request is determined. Determining information about the gesture that is relevant to the search request may include comparing potential meanings associated with the gesture and refine the search using the determined meaning. Thus, assume that a particular gesture of a pointed finger moving in a circle can mean "wrap it up" or "around me" or "circle." This gesture, in combination with a commensurate search request to "find a best place to sit outside" can be determined to be "around me" rather than "wrap it up" or "circle." Thus, the search is refined and a closest park bench around the user is indicated.

The gesture information may instead indicate a geographical direction, such as a building, object, street, area, or alleyway. By way of illustration, consider FIG. 4, which shows a person 402 making a gesture 404 that indicates a direction 406 down a street 408. Thus, search manager 104 may receive a search request (e.g., through a mobile computing device), and determine information about gesture 404 indicating direction 406. This direction 406 can then be further analyzed based on the person's or device's location (e.g., global position system (GPS) enabled devices) and/or which street or object to which the person is pointing.

The gesture information may indicate a control input associated with the gesture. Assume that a user makes a gesture with a thumb-up fist turning in a clockwise direction. Assume also that this gesture is mapped to the following inputs, three of which are control inputs: i) turn up volume; ii) fast forward; iii) aunt (from American Sign Language); and iv) reset to default settings (from prior user selection). Thus, one, for "aunt" is a word mapped to the gesture, and the other three, "turn up volume," "fast forward," and "reset to default settings" are controls recognized by some device or application that are mapped to this same gesture. Thus, at 306, search manager 104 determines which of these three control inputs include information relevant to the search.

By way of another example, assume that a gesture of a hand's fingers and thumb spreading apart is mapped to a "zoom in" control input as well as an "expand interface to cover display" control input. Search manager 104 can determine that the "zoom in" control input is relevant based on the search request of "find best gyro shop" to mean the menu of the gyro shop as a way to "zoom in" to the search results.

At 308, a search is performed using the search query and the determined information from the gesture. This search can be caused to be performed by a computing device that receives the gesture and query or by the computing device itself. Thus, the computing device may pass the query and gesture information to a remote device (e.g., a server) to perform the search. Also, the search can be performed using the query and then refined or performed with both the query and gesture information. Thus, the determined information for the gesture may be used in a search or to refine a prior search that used the search query.

Figure 4:
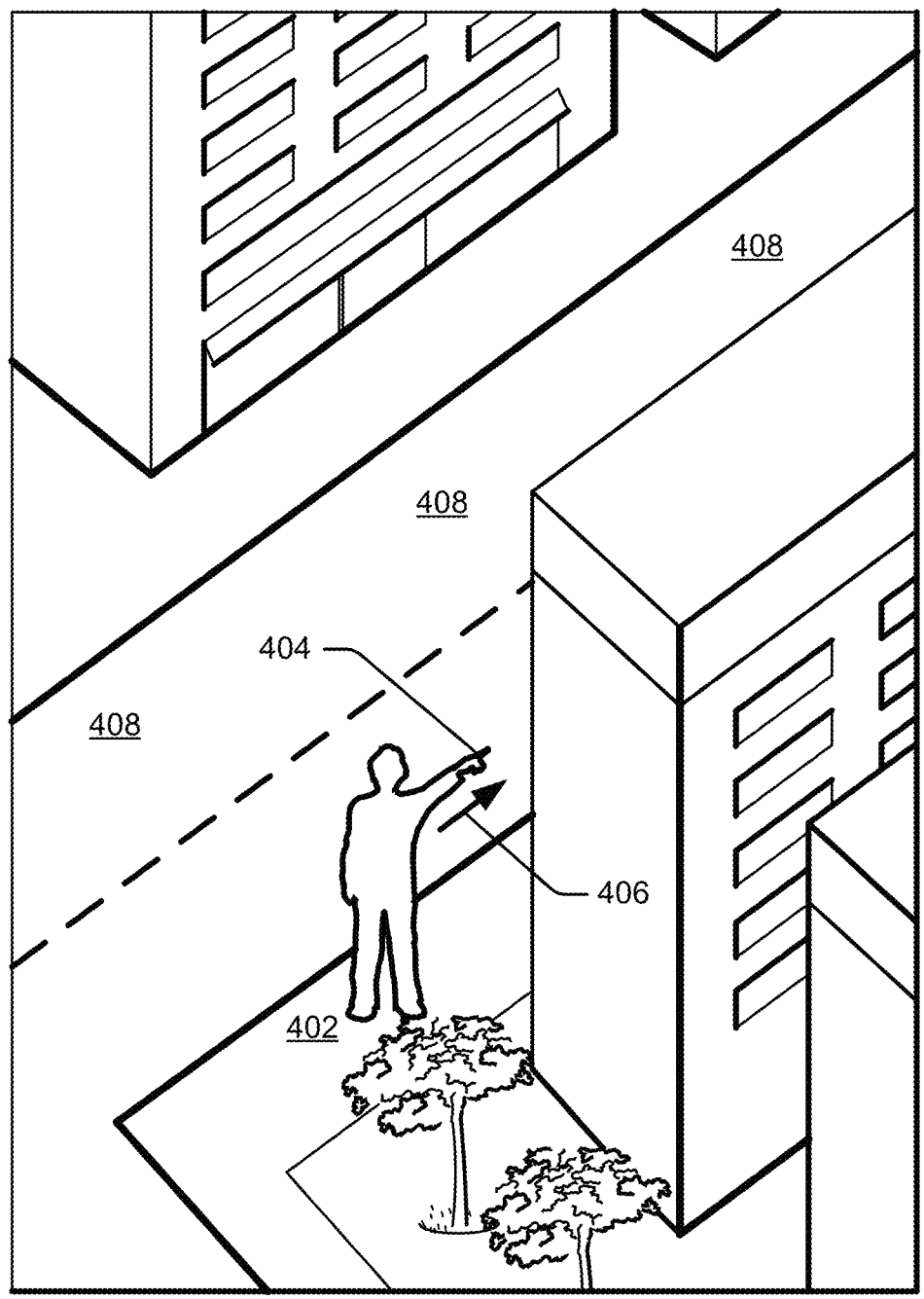
FIG. 4 illustrates a person with a gesture pointing down a street.

Continuing the ongoing example shown in FIG. 4, assume that the search query received at operation 302 is "find me a good Café". Search manager 104 then determines, as noted above, that the gesture indicates street 408. Based on these, search manager 104 performs a search for a Café with good ratings that is down street 408 from person 402 (e.g., café's with that street's address and within a reasonable walking distance).

At 310, search results from performing the search using the search query and the determined information are provided, such as to a person requesting the search. These search results can be in various forms, such as locations on a map, a list of terms or webpages, and presentation of media, such as when a search results in a song being found. Concluding the example of FIG. 4, assume an audio system reads the result or a display of a mobile device (e.g., display 208 of computing spectacles 102-6 of FIG. 2) presents a list or map showing the cafés.

To further illustrate ways in which method 300 may be performed, consider the following three examples. In a first example, assume that a search request is received through an audio communication system and that determining information at operation 306 is responsive to and based on a gesture being received commensurate with receiving the search request through the audio communication system. Thus, a user speaks a query for a search and a gesture is received and analyzed based on being commensurate with the audio request.

In a second example, assume that a gesture points at an object commensurate with receiving a search request, such as "what kind of tree is that?" and pointing at a tree. Gesture information can be determined, based on the details provided by radar-based recognition system 106, to be pointing at particular tree. This tree can be determined with a camera or other sensor of a mobile computing device also used in the search or based on a location of the user and known tree types near the person and in the appropriate direction. Search manager 104, with this information (e.g., a name of the tree), can present results indicating the informal name "Pecan Tree," and search to find the technical name "Carya Illinoinensis," that it is native to the Americas, and has only very recently been domesticated as a crop in 1880 AD. Aside from the greater implications of computer-aided searching that benefit generally from these techniques, consider a child wearing computing spectacles 102-6 that use these techniques. The child could discover an amazing breadth and depth of information about her world through this teaching tool.

In a third example, consider a case where search manager 104 receives, through a mobile or non-mobile device, a request for "a fruit smoothie" along with making a stepped gesture known to have a meaning of a path or map. Search manager 104 can determine that this information for the gesture indicates a path and, based on a time of day and a known path that the person takes to work, perform a search for a fruit smoothie along the person's typical walk and subway path to work. Thus, search manager 104 can perform or refine the search to the intended path and provide places at which to get a fruit smoothie along that intended path.

Note that in some cases a person's gestures have a meaning or a control input associated with it, and that these can be determined as information relevant to a search. In other cases, gestures indicate a direction and thus some object, street, location, and so forth that is relevant to a search. In still another example noted below, a gesture indicates an entity relevant to a search that is in media. In some cases this media is an audio-visual program, such as a television program where the entity indicated by the gesture is an object in the program—e.g., a car or person. In some other cases this media is a document, list, or other presentation of data, such as a table of data or a list of search results. Indicating, through a gesture, an item in the search results can then refine the search based on the item or select the item. If refining the search, the gesture permits a simple and easy way to drill down into the search results. Gesture information therefore encompasses a broad variety of information relevant to computer-aided searching.

Turning to FIG. 5, consider method 500, which performs a search using information determined from a radar-recognized gesture. This information may or may not include a search query selected explicitly by a person.

At 502, an indication that a person is requesting a search is received. This indication can be received as an explicit research request, such as a search query (e.g., words) entered into a data-entry field. In some cases, however, the indication can be simply a gesture, such as the gesture received at operation 504 below or some other gesture.

At 504, a gesture received through a radar-based recognition system is recognized. Note that this gesture can be recognized, and information about it determined, responsive to another gesture received through the radar-based recognition system and determined to indicate a search.

At 506, information about the gesture sufficient to perform a search is determined. This information can include the various types of information noted above. Note that the methods may, prior to performing the search using the determined information, prompt the person for additional information, receive the additional information, and perform the search with the additional information. This can be useful in cases where search manager 104 determines that the information determined at operation 506 is not sufficient for adequately directed or detailed search results.

As noted above, methods 500 may operate with little or no non-gesture inputs. Consider, by way of example, a person desiring to find food down a particular street and that, due to bad weather, loud surroundings, or a physical disability (e.g., being mute), does not make audio or touch selections. The person may select, with a gesture to indicate that she is requesting a search, to search and then select one or more other gestures. Assume that she makes a circular gesture in the air, then puts her hand to her mouth as a second gesture, and then points down a street as a third gesture. Search manager 104 may determine that the circular gesture indicates a search is desired, the second gesture is determined to be information having a meaning of "find food or restaurants," and the third gesture is also recognized as a geographical direction. Based on these gestures, information can be determined to refine to search to food or restaurants down the street that the person pointed.

At 508, the requested search is performed using the determined information. Note that the search can be performed using only the determined information from the gesture, though this is not required. In some cases, however, additional information is used, such as a search query received at operation 502, or search manager 104 can find other contextual information, such as that the computing device through which the gesture is received is playing media, and thus that this media can be used as additional information, or location data indicating that the person is at a park, and so forth.

At 510, the search results resulting from performing the requested search using the determined information are provided. Concluding the example in which only gestures are used, a computing device provides food stores and restaurants down the street in one of the various manners described herein.

Figure 6:
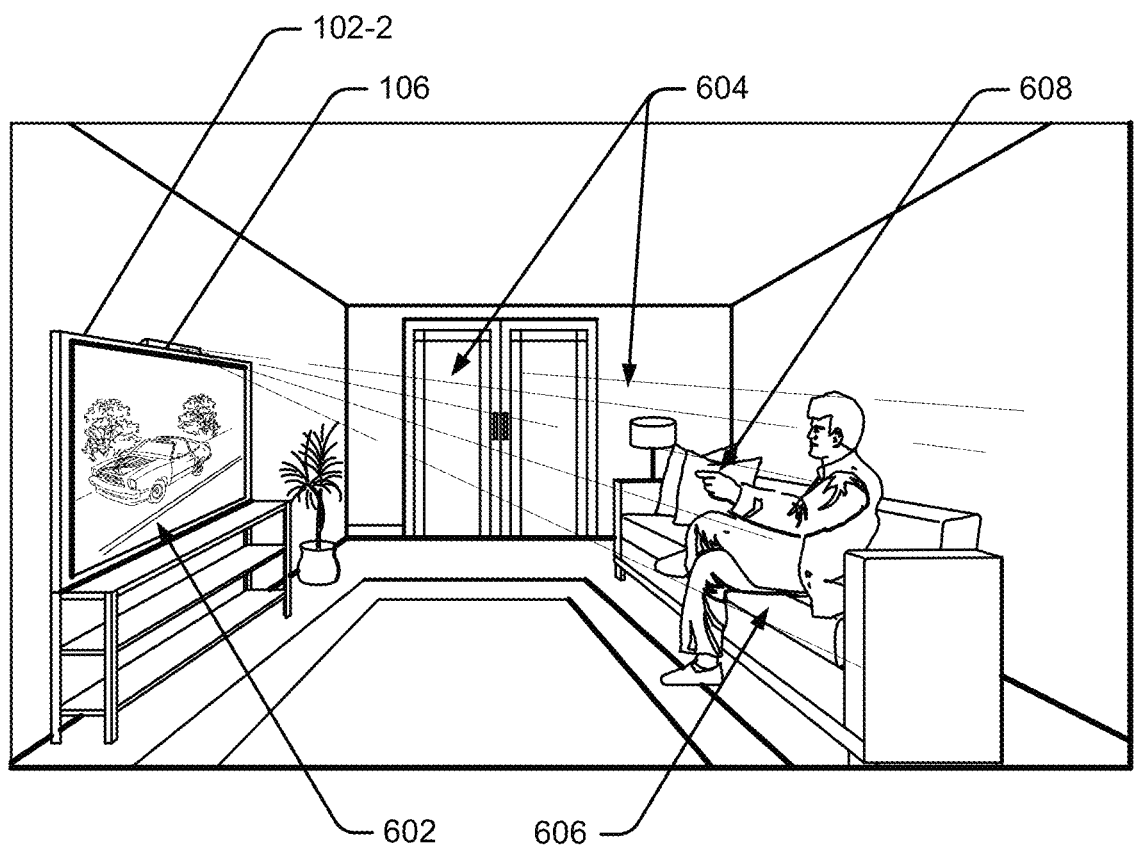
FIG. 6 illustrates a television playing audio-visual media, a radar-based recognition system, a radar field, and a person performing a pointing gesture pointing at an object within the media.

To illustrate ways in which method 500 may be operate, consider FIG. 6. FIG. 6 shows television 102-2 playing audio-visual media 602, radar-based recognition system 106 as a peripheral to television 102-2, a radar field 604 generated by radar-based recognition system 106, and a person 606 performing a pointing gesture 608. Here assume that person 606 is watching audio-visual media 602 (e.g., a movie) and sees a car on television 102-2. Assume also that persons 606 wants to know more about this car. The techniques, either following method 300 or 500 or some combination thereof, permit person 606 to search for information about this car with as little as a statement "what kind of car is that" and pointing gesture 608 or a gesture indicating a search is desired and pointing gesture 608, even without any statement. Television 102-2, through radar-based recognition system 106, can determine sufficient information about the gesture and, by search manager 104 analyzing audio-visual media 602 at a time commensurate with the gesture, perform or refine a search. Then search manager 104 causes television 102-2's display or speakers to present results of the search.

Figure 7:
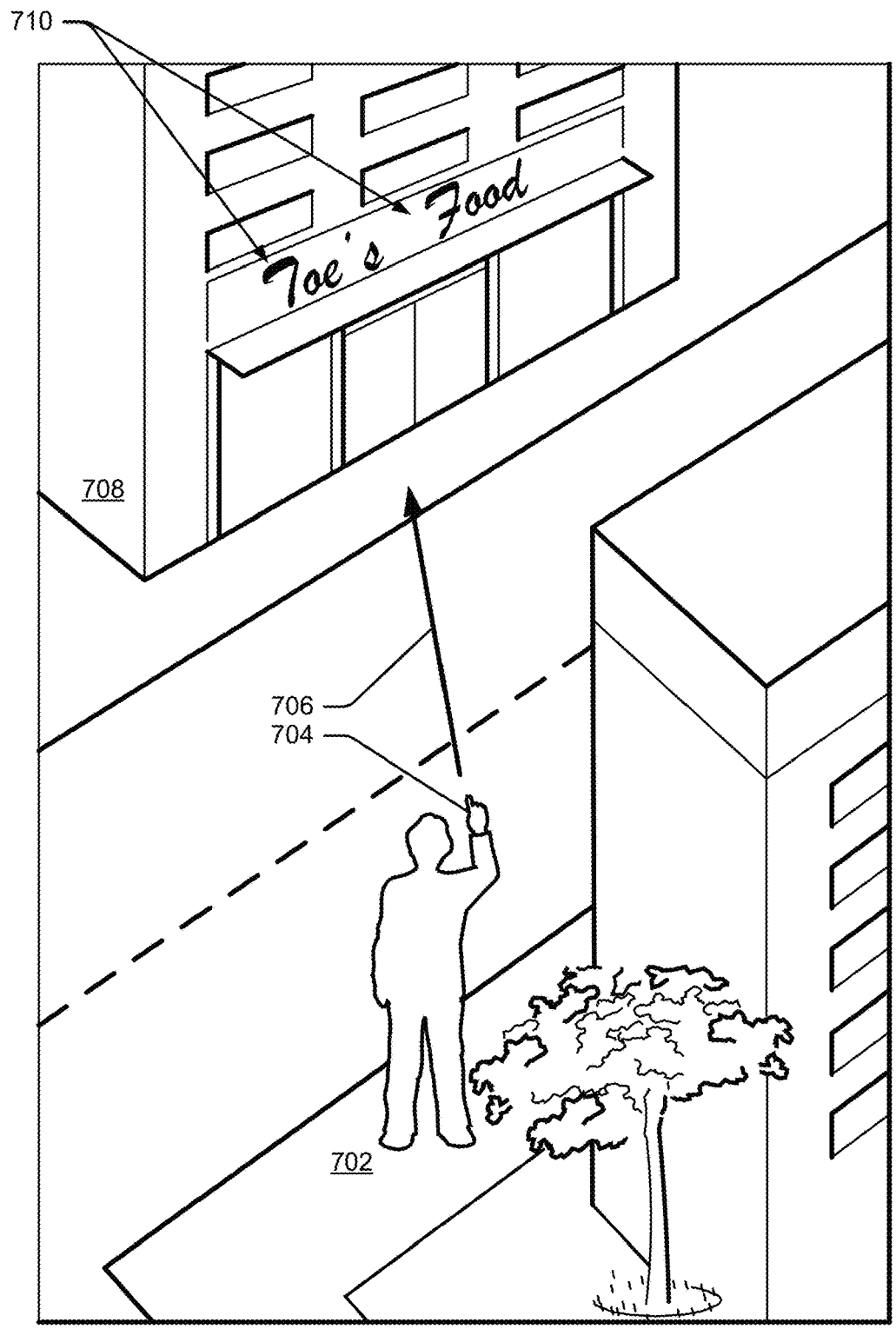
FIG. 7 illustrates a person pointing to a building having a business.

To illustrate another way in which methods 300 or 500 may be operate, consider FIG. 7, which shows a person 702 pointing with a gesture 704 along a direction 706 to a building 708 having a business 710 (Joe's Food). The techniques, with or without a search query, can determine sufficient information about gesture 704 to perform a search to find out more about businesses at building 708, such as Joe's Food. Thus, search manager 104 can determine the building that is being pointed out, businesses at the building, a likely business of interest based on a prominent storefront or large percentage of the square footage of building 708, and provide search results indicating that Joe's Food is not a grocery, but is instead a high-end seafood restaurant. Additional information may also be provided to person 702, such as a menu or hours of operation for Joe's Food. Refining the search be responsive to the person indicating some search query, such as "what is Joe's," but that is not required.

Turning to FIG. 8, method 800 performs a search based on a search query and radar-determined physiological information for a person. Thus, a search can be performed using information about a person's physiology, independent or in conjunction with other search information.

At 802, a search request having a search query is received. This search request can be received from an input device, such as a computing device, audio recognition software, user interface, and so forth. The search request can be associated with a person, such as one associated with the input device. This association can be based on the input, or having a right to control the input device.

At 804, physiological information about the person is determined through a radar-based recognition system. Details of ways in which radar-based recognition system 106 operates are described above and, as noted, can differentiate objects, fabric, and other materials from human tissue, or even particular types of human tissue. Therefore, the techniques are capable of determining a person's body or skin temperature, heart rate, perspiration, stress level, hydration level, and so forth.

At 806, the requested search is performed using the a search query and the determined physiological information about the person. Any suitable information sources may be searched, such as the Internet, an intranet, local device data, a search history associated with a user, a location history associated with the user, social media, calendar information, and the like.

At 808, the search results resulting from performing the requested search using the search query and the determined physiological information is provided. By way of example, assume that a person requests a search of "find a good place for a drink." If, at 804, search manager 104 determined that the person is dehydrated, search manager 104 may present lower-rated stores and cafés near the person but, if the person is not dehydrated, instead present better-rated stores and cafés further from the person. If, on the other hand, the physiological information indicates a physical orientation, such as a gate and direction of the person and thus that the person is walking a particular direction, to present search results along the particular direction rather than simply near (and possible behind, left, or right from) the person.

While the above examples are directed to Internet searches, these are not the only computer-aided searches contemplated by the techniques. File searches, media searches, such as searching metadata for audio-visual media 602 instead of an Internet search, catalog or list searches, and so forth can benefit from the techniques.

The preceding discussion describes methods relating to radar recognition-aided searches. Aspects of these methods may be implemented in hardware (e.g., fixed logic circuitry), firmware, software, manual processing, or any combination thereof. These techniques may be embodied on one or more of the entities shown in FIGS. 1, 2, 4, 6, 7, and 9 (electronic device 900 is described in FIG. 9 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Electronic Device

Figure 9:
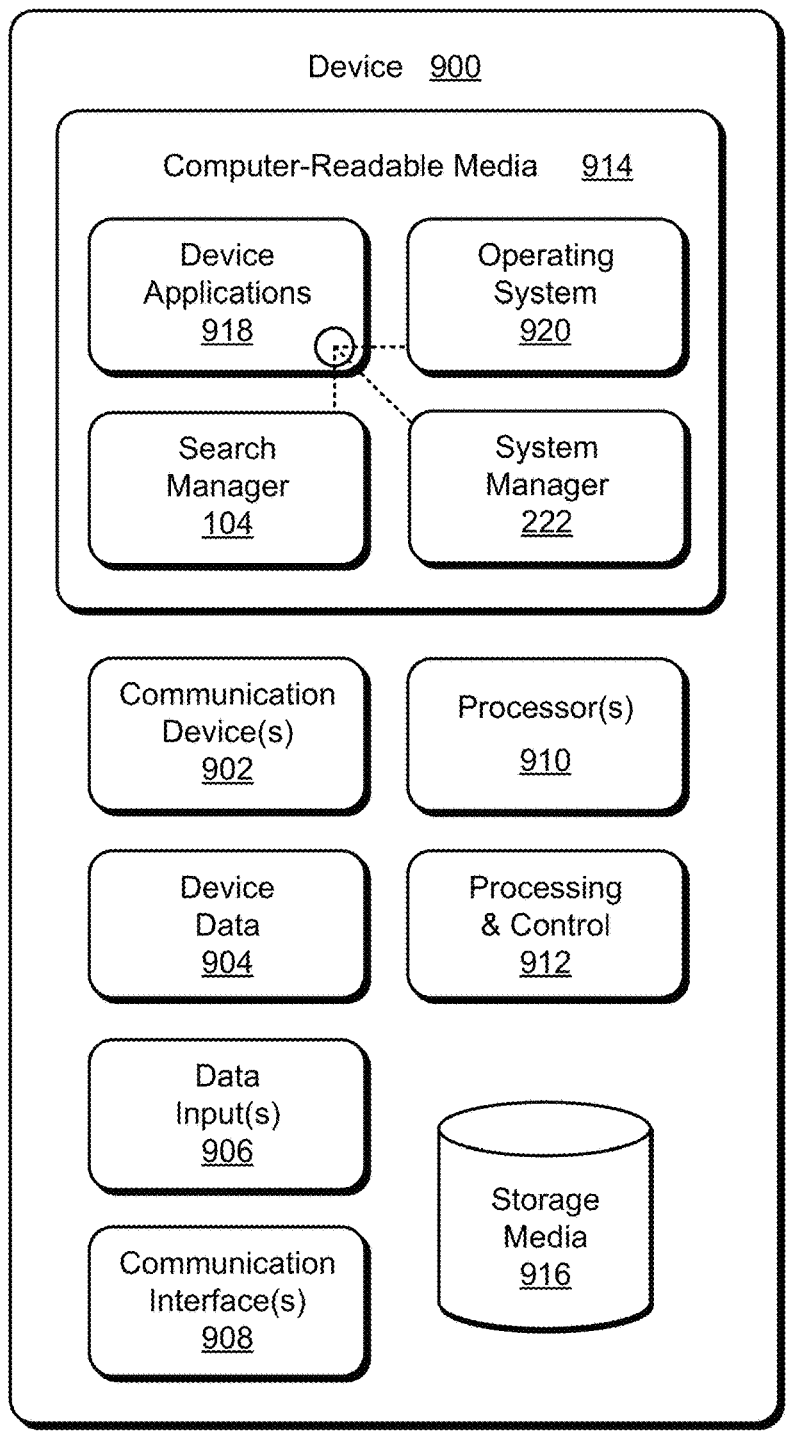
FIG. 9 illustrates an example electronic device enabling, or in which techniques may be implemented that enable use of, a radar recognition-aided search.

FIG. 9 illustrates various components of example electronic device 900 (device 900) that can be implemented as any type of client, server, and/or computing device as described with reference to the previous FIGS. 1-8 to implement radar recognition-aided searches.

Device 900 includes communication devices 902 that enable wired and/or wireless communication of device data 904 (e.g., received data, data that is being received, data scheduled for broadcast, data packets of the data, etc.). Device data 904 or other device content can include configuration settings of the device, media content stored on the device, and/or information associated with a user of the device (e.g., an identity of an actor performing a gesture). Media content stored on device 900 can include any type of audio, video, and/or image data. Device 900 includes one or more data inputs 906 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

Device 900 also includes communication interfaces 908, which can be implemented as any one or more of a serial and/or parallel interface, a wireless interface, any type of network interface, a modem, and as any other type of communication interface. Communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like), which process various computer-executable instructions to control the operation of device 900 and to enable techniques for, or in which can be embodied, a radar recognition-aided search. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device (storage media) 916.

Computer-readable media 914 provides data storage mechanisms to store device data 904, as well as various device applications 918 and any other types of information and/or data related to operational aspects of device 900. For example, an operating system 920 can be maintained as a computer application with computer-readable media 914 and executed on processors 910. Device applications 918 may include a device manager, such as any form of a control application, software application, signal-processing and control module, code that is native to a particular device, a hardware abstraction layer for a particular device, and so on. Device applications 918 also include system components, engines, or managers to implement radar recognition-aided searches, such as search manager 104 and system manager 222.

CONCLUSION

Although embodiments of techniques enabling radar recognition-aided searches have been described in language specific to features and/or methods, it is to be understood that the subject of the appended claims is not necessarily limited to the specific features or methods described. Rather, the specific features and methods are disclosed as example implementations of ways in which to perform a radar recognition-aided search.

What is claimed is:

1. A computer-implemented method, the method implemented on a smartphone and comprising:
   receiving, by the smartphone, an audio search request having a search query;
   recognizing, by the smartphone, an in-the-air gesture that has multiple potential meanings and is received through a radar-based recognition system, the recognizing based on reflections of a radar field received by an antenna of the radar-based recognition system;
   determining, by the smartphone and based on the search query, a meaning from the multiple potential meanings, the determined meaning indicating an object to which the in-the-air gesture is directed;
   causing, by the smartphone, a search to be performed, the search based on the received search query and the object to which the in-the-air gesture is directed; and
   providing, by the smartphone, search results responsive to performance of the search.

2. The computer-implemented method as described in claim 1, wherein receiving the audio search request having the search query receives the audio search request through a microphone of the smartphone, determining the meaning of the in-the-air gesture indicates that the object to which the in-the-gesture is directed is in audio-visual media, and providing the search results provides the search results in the form of locations on a map, a list of terms, webpages, or a media presentation.

3. The computer-implemented method as described in claim 1, wherein the determining the meaning determines the meaning to be a pointing gesture that is pointing at the object.

4. The computer-implemented method as described in claim 3, wherein the determining the meaning to be the pointing gesture further comprises determining that the pointing gesture is directed at a display on which the object is presented.

5. The computer-implemented method as described in claim 3, wherein the pointing gesture refines the search query, the search query indicating multiple possible subjects associated with multiple objects on the display, the pointing gesture useable to determine the object from the multiple possible objects on the display effective to select a selected subject from the multiple possible subjects.

6. The computer-implemented method as described in claim 5, wherein causing the search to be performed comprises adding, to the search query, text associated with or identifying the selected subject.

7. A portable electronic device, the portable electronic device being a smartphone or wearable device comprising:
a display, the display configured to present audio-visual media;
a microphone, the microphone configured to receive an audio search request;
computer-readable storage media configured to store instructions; and
at least one processor, the processor configured to execute the instructions to:
receive, through the microphone, an audio search request having a search query;
recognize an in-the-gesture that has multiple potential meanings and is received through a radar-based recognition system, the recognizing based on reflections of a radar field received by an antenna of the radar-based recognition system;
determine, based on the search query, a meaning from the multiple potential meanings, the determined meaning indicating an object to which the in-the-air gesture is directed;
cause a search to be performed, the search based on the received search query and the object to which the in-the-air gesture is directed; and
provide search results responsive to performance of the search.

8. The portable electronic device of claim 7, wherein determining the meaning determines that the object to which the in-the-air gesture is directed is in audio-visual media and providing the search results provides the search results in the form of locations on a map, a list of terms, webpages, or a media presentation.

9. The portable electronic device of claim 7, wherein the portable electronic device is a wearable device, the wearable device comprising the radar-based recognition system.

10. The portable electronic device of claim 9, wherein the wearable device determines information about the in-the-air gesture that is relevant to the search request, the determination including comparing potential meanings associated with the in-the-air gesture.

11. The portable electronic device of claim 7, wherein the determining the meaning from the multiple potential meanings determines the meaning to be a pointing gesture that is pointing at the object.

12. The portable electronic device of claim 11, wherein the determining the meaning to be the pointing gesture further comprises determining that the pointing gesture is directed at the display or another display on which the object is presented.

13. The portable electronic device of claim 11, wherein the pointing gesture refines the search query, the search query indicating multiple possible subjects associated with multiple objects on the display or on another display, the pointing gesture useable to determine the object from the multiple objects effective to select a selected subject from the multiple possible subjects.

14. The portable electronic device of claim 13, wherein causing the search to be performed comprises adding, to the search query, text associated with or identifying the selected subject.

15. A computer-implemented method comprising:
receiving a search request having a search query;
recognizing an in-the-air gesture that has multiple potential meanings and is received through a radar-based recognition system, the recognizing based on reflections of a radar field received by an antenna of the radar-based recognition system;
determining, based on the received search query, a meaning from the multiple potential meanings, the determined meaning indicating an element in audio-visual media to which the in-the-air gesture is directed;
causing a search to be performed, the search based on the received search query and the indicated element in the audio-visual media to which the in-the-air gesture is directed; and
causing search results to be provided responsive to performance of the search.

16. The computer-implemented method as described in claim 15, wherein receiving the search request and determining the meaning is responsive to and based on the in-the-air gesture being recognized commensurate with receiving the search request.

17. The computer-implemented method as described in claim 15, wherein the method is performed by a smart appliance.

18. The computer-implemented method as described in claim 15, wherein the element in the audio-visual media is presented on a television (TV).

19. The computer-implemented method as described in claim 18, wherein causing the search to be performed based on the received search query and the indicated element includes causing the search to be performed using information about the indicated element received from the TV over a wireless network.

20. The computer-implemented method as described in claim 18, wherein the radar-based recognition system is integral with the TV.

21. The computer-implemented method as described in claim 15, wherein the radar-based recognition system is integral with a smart appliance, the radar-based recognition system effective to receive, through the antenna, the reflections of the radar field and generate, based on the received reflections, gesture information, and wherein recognizing the in-the-air gesture is based on the generated gesture information.

22. The computer-implemented method as described in claim 21, wherein the smart appliance determines information about the in-the-air gesture that is relevant to the search query, the determination including comparing the multiple potential meanings associated with the in-the-air gesture.

23. The computer-implemented method as described in claim 15, wherein determining the meaning determines the meaning to include a pointing gesture.

24. The computer-implemented method as described in claim 23, wherein determining the meaning to include the pointing gesture further comprises determining that the pointing gesture is directed at a display on which the audio-visual media is presented.

25. The computer-implemented method as described in claim 24, wherein the method is performed by a smart appliance, the display is associated with a television (TV), and further comprising the smart appliance requesting metadata about the audio-visual media from the TV or an entity associated with the TV.

26. The computer-implemented method as described in claim 25, further comprising:
receiving, at the smart appliance, the metadata about the audio-visual media; and determining, based on the metadata, information about the element, and wherein the search is further based on the determined information about the element.

27. The computer-implemented method as described in claim 25, further comprising the smart appliance prompting the TV to determine information about the element presented on the display of the TV.

28. The computer-implemented method as described in claim 27, further comprising the smart appliance receiving information about the element presented on the display of the TV through communication over a wireless network and from the entity associated with the TV, and wherein the search is further based on the information about the element.

29. The computer-implemented method as described in claim 15, wherein determining the meaning is further based on analysis of an image captured, by a camera, of the element in the audio-visual media.

30. The computer-implemented method as described in claim 29, wherein analysis of the captured image generates information about the element in the audio-visual media, and wherein the search is further based on the information about the element.

31. The computer-implemented method as described in claim 15, wherein the in-the-air gesture is recognized as a pointing gesture directed at a display associated with a TV, the display of the TV presenting the audio-visual media, the audio-visual media presenting the element and at least one other element, and wherein determining the meaning indicating the element is based on determining that the pointing gesture is directed at the element in the audio-visual media.

32. The computer-implemented method as described in claim 31, wherein the smart appliance provides search results, responsive to the search request, to the TV such that the TV can present the search results, the search results in a form of a list of terms, text, one or more webpages, or a media presentation.

33. The computer-implemented method as described in claim 31, wherein the smart appliance provides search results as audio output, responsive to the search request, to a user.

34. The computer-implemented method as described in claim 15, wherein the in-the-air gesture is recognized as a pointing gesture directed at a display, the display presenting the audio-visual media, and the audio-visual media presenting multiple possible elements associated with the search query, and wherein determining the meaning indicating the element is based on determining that the pointing gesture is directed at the element in the audio-visual media.

35. The computer-implemented method as described in claim 34, wherein the selected element includes text that refines or adds information to the search query.

36. The computer-implemented method as described in claim 15, wherein causing search results to be provided causes a smart appliance to provide the search results as audio output.

37. A computing device comprising:
a display, the display configured to present audio-visual media;
a microphone, the microphone configured to receive an audio search request;
a radar-based recognition system;
computer-readable storage media configured to store instructions; and
at least one processor, the processor configured to execute the instructions to:
receive, through the microphone, an audio search request having a search query;
recognize an in-the-gesture that has multiple potential meanings and is received through the radar-based recognition system, the recognition based on reflections of a radar field received by an antenna of the radar-based recognition system;
determine, based on the search query, a meaning from the multiple potential meanings, the determined meaning indicating an element in audio-visual media displayed on the display and to which the in-the-air gesture is directed;
cause a search to be performed, the search based on the received search query and the indicated element in the audio-visual media to which the in-the-air gesture is directed; and
cause search results to be provided responsive to performance of the search.

38. The computing device of claim 37, wherein determining the meaning is further based on a relevance of each of the multiple potential meanings to search request.

39. The computing device of claim 37, wherein the computing device is a smart appliance, the smart appliance includes a speaker configured to produce an audio output, and wherein to cause the search results to be provided provides the search results as audio output through the speaker.

40. The computing device of claim 37, wherein the computing device is a computing system including a television (TV) on which the element is displayed and a smart appliance that includes the computer-readable storage media and the at least one processor.

41. The computing device of claim 40, wherein the radar-based recognition system is integral with the TV, the radar-based recognition system effective to receive the in-the-air gesture and generate gesture information, the gesture information communicated by the TV via the wireless network and recognized by the smart appliance.

42. The computing device of claim 37, wherein the determination of the meaning includes a determination that the meaning includes a pointing gesture.

43. The computing device of claim 42, wherein the determination of the meaning to include the pointing gesture further comprises determining that the pointing gesture is directed at the display on which the audio-visual media is presented.

44. The computing device of claim 43, wherein the execution of the instructions is performed by a smart appliance, the display is associated with a television (TV), and further comprising the smart appliance requesting metadata about the audio-visual media from the TV or an entity associated with the TV.

45. The computing device of claim 44, wherein the instructions are further configured to:
receive, at the smart appliance, the metadata about the audio-visual media; and
determine, based on the metadata, information about the element, and wherein the search is further based on the determined information about the element.

46. The computing device of claim 37, wherein the determination of the meaning is further based on analysis of a captured image of the element in the audio-visual media.

47. The computing device of claim 46, wherein the instructions are further configured to analyze the captured image through image identification to generate information about the element in the audio-visual media, and wherein the search is further based on the information about the element.

48. The computing device of claim 37, wherein the in-the-air gesture is recognized as a pointing gesture directed at the display presenting the audio-visual media, the audio-visual media presenting the element and at least one other element, and wherein determining the meaning indicating the element is based on determining that the pointing gesture is directed at the element in the audio-visual media.

49. The computing device of claim 48, wherein the selected element includes text that refines or adds information to the search query.

50. The computing device of claim 37, wherein the cause the search results to be provided causes a smart appliance to provide the search results as audio output through a speaker of the smart appliance, text through the display or another display associated with the computing device, or another audio-visual media through a television or computer monitor associated with the computing device.

* * * * *